United States Patent
Yamakawa

(10) Patent No.: US 10,649,700 B2
(45) Date of Patent: May 12, 2020

(54) IMAGE GENERATION-OUTPUT CONTROL APPARATUS, METHOD OF CONTROLLING IMAGE GENERATION-OUTPUT CONTROL APPARATUS, AND STORAGE MEDIUM

(71) Applicant: RICOH COMPANY, LTD., Tokyo (JP)

(72) Inventor: Takuya Yamakawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/428,117

(22) Filed: Feb. 8, 2017

(65) Prior Publication Data
US 2017/0242635 A1    Aug. 24, 2017

(30) Foreign Application Priority Data
Feb. 18, 2016    (JP) .................................. 2016-029227

(51) Int. Cl.
*G06F 3/12* (2006.01)
*G06K 15/02* (2006.01)

(52) U.S. Cl.
CPC ............ *G06F 3/1208* (2013.01); *G06F 3/126* (2013.01); *G06F 3/1212* (2013.01);
(Continued)

(58) Field of Classification Search
None
See application file for complete search history.

(56) References Cited

U.S. PATENT DOCUMENTS 5,113,494 A * 5/1992 Menendez ............. G06K 15/00
                                                        345/501
6,091,507 A * 7/2000 Vatland .................. H04L 69/26
                                                        358/1.13

(Continued)

FOREIGN PATENT DOCUMENTS

JP    2004-246583    9/2004
JP    2009-005377    1/2009
(Continued)

OTHER PUBLICATIONS

Japanese Office Action dated Jun. 4, 2019, issued in corresponding Japanese Patent Application No. 2016-029227, 2 pages.

*Primary Examiner* — Beniyam Menberu
(74) *Attorney, Agent, or Firm* — Xsensus LLP

(57) ABSTRACT

An image generation-output control apparatus for controlling an image generation and output operation based on an instruction received from a server in an image processing system. The server includes a first memory to store first image processing data applicable to an image processing for outputting a target image, first circuitry to generate first image drawing information based on output target image information and the first image processing data when performing an image forming operation. The image generation-output control apparatus includes second circuitry, having one or more capabilities compatible with one or more capabilities of the first circuitry of the server. The second circuitry generates second image drawing information based on the output target image information and the first image processing data acquired from the server, and instructs an image forming apparatus to perform an image forming operation based on the generated second image drawing information.

7 Claims, 16 Drawing Sheets

(52) U.S. Cl.
CPC .......... *G06F 3/1215* (2013.01); *G06F 3/1247* (2013.01); *G06F 3/1282* (2013.01); *G06F 3/1291* (2013.01); *G06F 3/1296* (2013.01); *G06F 3/1298* (2013.01)

(56) References Cited

U.S. PATENT DOCUMENTS

| | | | | |
|---|---|---|---|---|
| 6,295,133 | B1 * | 9/2001 | Bloomquist | ............ B41B 21/32 358/1.1 |
| 6,594,034 | B1 * | 7/2003 | Bloomquist | ............ B41B 21/32 358/1.18 |
| 2001/0043355 | A1 * | 11/2001 | Bando | .................... G06K 15/00 358/1.15 |
| 2002/0191210 | A1 * | 12/2002 | Staas | ................. H04L 29/08846 358/1.15 |
| 2004/0061892 | A1 * | 4/2004 | Ferlitsch | ............... G06F 3/1211 358/1.15 |
| 2004/0086155 | A1 * | 5/2004 | Furukawa | ............... G06T 7/001 382/112 |
| 2005/0270560 | A1 * | 12/2005 | Ferlitsch | ............... G06F 3/1208 358/1.15 |
| 2006/0028670 | A1 * | 2/2006 | Amano | ................. G06F 3/1204 358/1.13 |
| 2007/0070376 | A1 * | 3/2007 | Owen | ................... G06F 3/1214 358/1.13 |
| 2007/0165267 | A1 * | 7/2007 | Fransazov | ............... G06F 3/1207 358/1.15 |
| 2009/0185214 | A1 * | 7/2009 | Bellert | ............... G06K 15/1806 358/1.15 |
| 2012/0287469 | A1 * | 11/2012 | Tomiyasu | .......... H04N 1/00244 358/1.15 |
| 2013/0070260 | A1 * | 3/2013 | Tokushima | ............... H04N 1/54 358/1.2 |
| 2013/0286430 | A1 * | 10/2013 | Morris | ................... G06F 3/1203 358/1.15 |
| 2013/0335763 | A1 * | 12/2013 | Mizutani | ............... G06F 3/1298 358/1.13 |
| 2015/0049365 | A1 * | 2/2015 | Shibata | ................. G06F 3/1204 358/2.1 |
| 2015/0261490 | A1 * | 9/2015 | Fujieda | ................. G06F 3/1275 358/1.15 |
| 2016/0259606 | A1 | 9/2016 | Aoki et al. | |
| 2016/0259999 | A1 * | 9/2016 | Tokushima | ................ G06F 3/12 |
| 2016/0275386 | A1 | 9/2016 | Aoki | |
| 2017/0163841 | A1 * | 6/2017 | Taima | ................. G06K 15/1823 |
| 2017/0235605 | A1 * | 8/2017 | Chaloupka | ............ G06F 9/4881 718/103 |

FOREIGN PATENT DOCUMENTS

| | | |
|---|---|---|
| JP | 2012-108821 | 6/2012 |
| JP | 2015-036920 A | 2/2015 |
| JP | 2015-066936 | 4/2015 |
| JP | 2015-194994 | 11/2015 |
| JP | 2015-194995 | 11/2015 |
| JP | 2016-177541 | 10/2016 |

* cited by examiner

FIG. 3

```
JDF INFORMATION
JOB INFORMATION                             RIP STATUS
  NUMBER OF COPIES         : XX COPIES        PRE-FLIGHT : NotYet
  NUMBER OF TOTAL PAGES    : XX PAGES         NORMALIZE  : NotYet
  RIP CONTROL MODE         : PAGE MODE        FONT       : NotYet
                                              LAYOUT     : NotYet
EDIT INFORMATION                              MARK       : NotYet
  ORIENTATION INFORMATION  : PORTRAIT         CMM        : NotYet
  PRINT FACE INFORMATION   : DUPLEX           TRAPPING   : NotYet
  ROTATION                 : 90 DEGREES       CALIBRATION: NotYet
  ENLARGE/REDUCE           : 125%             SCREENING  : NotYet
  IMAGE POSITION                               . . .
    OFFSET                 : XX
    POSITION ADJUSTMENT    : XX              RIP DEVICE DESIGNATION
    INFORMATION
  LAYOUT INFORMATION                          PRE-FLIGHT : HWF SERVER
    CUSTOM-IN-POSITION     : XX               NORMALIZE  : HWF SERVER
    NUMBER OF PAGES        : 2 IN 1           FONT       : DFE (ENGINE A)
    IMPOSITION INFORMATION : LEFT TO          LAYOUT     : DFE (ENGINE A)
                             RIGHT            MARK       : DFE (ENGINE B)
    PAGE SEQUENCE          : XX               CMM        : DFE (ENGINE A)
    INFORMATION                               TRAPPING   : DFE (ENGINE A)
    CREEP POSITION         : XX               CALIBRATION: DFE (ENGINE A)
    INFORMATION                               SCREENING  : DFE (ENGINE A)
  MARGIN INFORMATION       : XX                . . .
  CROP MARK INFORMATION
    CENTER CROP MARK       : XX              DEVICE       : DIGITAL PRINTER
    INFORMATION                              DESIGNATION
    CORNER CROP MARK       : XX

FINISHING INFORMATION
  COLLATE INFORMATION      : PAGE BY PAGE
  STAPLE/BINDING           : STAPLE
  INFORMATION
  PUNCH INFORMATION        : XX
  FOLDING INFORMATION      : XX
  TRIMMING                 : XX
  OUTPUT-TRAY INFORMATION  : TRAY XX
  INPUT-TRAY INFORMATION   : TRAY XX
  COVER SHEET INFORMATION  : XX
             . . .
```

FIG. 5

WORKFLOW INFORMATION
1) INPUT OF DATA
2) HWF SERVER (RIP)
3) PREVIEW
4) TRANSMISSION TO DFE
5) POST PROCESSING
. . .

FIG. 7

| JDF INFORMATION | JOB ATTRIBUTE IN DFE |
|---|---|
| A-AMOUNT | NUMBER OF COPIES |
| A-ROTATE | ROTATION |
| . . . | |

FIG. 8

```
RIP PARAMETER

TYPE OF INPUT/OUTPUT DATA   : JDF, PDL
DATA READING INFORMATION    : XXXX
RIP CONTROL MODE            : PAGE MODE
      . . .

INPUT/OUTPUT IMAGE INFORMATION
  INFORMATION OF OUTPUT IMAGE

. . .

INFORMATION OF INPUT IMAGE

. . .

INFORMATION OF IMAGE PROCESSING

. . .

PDL INFORMATION
  DATA AREA            : XXXX
  SIZE INFORMATION     : XXXX
  DATA ARRANGEMENT     : XXXX

RIP ENGINE IDENTIFICATION INFORMATION   : ENGINE A
```

OUTPUT DIFFERENCE LIST

| CAPABILITY | OUTPUT DIFFERENCE |
|---|---|
| ANNOTATION | YES |
| TRAPPING | YES |
| . . . | |

IMAGE GENERATION-OUTPUT CONTROL APPARATUS, METHOD OF CONTROLLING IMAGE GENERATION-OUTPUT CONTROL APPARATUS, AND STORAGE MEDIUM

CROSS-REFERENCE TO RELATED APPLICATION

This application claims priority pursuant to 35 U.S.C. § 119(a) to Japanese Patent Application No. 2016-029227, filed on Feb. 18, 2016 in the Japan Patent Office, the disclosure of which is incorporated by reference herein in its entirety.

BACKGROUND

Technical Field

This disclosure relates to an image generation-output control apparatus, a method of controlling the image generation-output control apparatus, a storage medium storing a program for controlling the image generation-output control apparatus.

Background Art

Systems that can define and control various processes for generating a printed product by using a data format such as job definition format (JDF) are known. This system can collectively control various types of printers such as offset printers and digital printers. This system is referred to as a hybrid work flow (HWF) system, and a server that controls the HWF system is referred to as a HWF server.

In this HWF system, the offset printer including a raster image processor (RIP) engine and the digital printer including a raster image processor (RIP) engine are operated based on the same print data, in which the output result of the offset printer and the output result of the digital printer are required to be same in various properties such as font, color tone, and layout. However, the RIP engine of the offset printer that generates raster data, which is to be used for the printing operation, based on the print data, and the RIP engine of the digital printer that generates raster data, which is to be used for the printing operation, based on the print data, are different RIP engines, and thereby the output result of the digital printer may become different.

The HWF system can be disposed with a plurality of RIP engines having different processing capabilities, in which the suitable IP engines can be selected. For example, JP-2012-108821-A discloses a technology that raster data generated by the RIP processing of the plurality of RIP engines are compared, and the to-be-used RIP engine is determined based on a comparison result.

Further, JP-2004-246583-A discloses a technology that embeds graphic data of font into print data so that the output results of different apparatuses, installed with different font data, can become the same result.

When the offset printer outputs an image, a RIP engine disposed in the HWF server generates the raster data (hereinafter, RIP processing), and transmits the raster data to a computer-to-plate (CTP) of the offset printer that generates a plate to be used at the offset printer. When the digital printer outputs an image, a digital front end (DFE) of the digital printer receives print data and performs the RIP processing, and then a printer engine performs the printing operation.

Therefore, it is required that the output result by the RIP engine that generates data to be transferred to the CTP and the output result by the RIP engine installed in the DFE become the same as much as possible. Since the technology of JP-2012-108821-A requires a comparing process of the raster data, the processing time becomes longer. Further, since the technology of JP-2004-246583-A is related to the font alone, the technology may not cope with overall properties of the printing operation.

SUMMARY

As one aspect of the present invention, an image generation-output control apparatus in an image processing system for controlling an image generation and output operation based on an instruction received from a server in the image processing system is devised. The server is configured to control a plurality of processes performable by the image processing system, and communicable with a first image forming apparatus and a second image forming apparatus in the image processing system. The server includes a first memory to store first image processing data applicable to an image processing for outputting a target image, first circuitry to generate first image drawing information based on output target image information and the first image processing data stored in the first memory when performing an image forming operation for the output target image information using the first image forming apparatus. The image generation-output control apparatus includes second circuitry, having one or more capabilities compatible with one or more capabilities of the first circuitry of the server. The second circuitry is configured to generate second image drawing information based on the output target image information and the first image processing data acquired from the server, and to instruct the second image forming apparatus to perform an image forming operation based on the generated second image drawing information.

As another aspect of the present invention, a method of controlling an image generation and output operation by using an image generation-output control apparatus in an image processing system based on an instruction received from a server in the image processing system is devised. The server is configured to control a plurality of processes performable by the image processing system, and communicable with a first image forming apparatus and a second image forming apparatus in the image processing system. The server includes a first memory to store first image processing data applicable to an image processing for outputting a target image, first circuitry to generate first image drawing information based on output target image information and the first image processing data stored in the first memory when performing an image forming operation for the output target image information using the first image forming apparatus. The method includes generating second image drawing information by using second circuitry disposed for the image generation-output control apparatus, the second circuitry having one or more capabilities compatible with one or more capabilities of the first circuitry of the server, based on the output target image information and the first image processing data acquired from the server, and instructing the second image forming apparatus, by using second circuitry disposed for the image generation-output control apparatus, to perform an image forming operation based on the generated second image drawing information.

As another aspect of the present invention, a non-transitory storage medium storing a program that, when executed by a computer, causes the computer to execute a method of controlling an image generation and output operation by using an image generation-output control apparatus in an image processing system based on an instruction received from a server in the image processing system, is devised. The server is configured to control a plurality of processes performable by the image processing system, and communicable with a first image forming apparatus and a second image forming apparatus in the image processing system. The server includes a first memory to store first image processing data applicable to an image processing for outputting a target image, first circuitry to generate first image drawing information based on output target image information and the first image processing data stored in the first memory when performing an image forming operation for the output target image information using the first image forming apparatus. The method includes generating second image drawing information by using second circuitry disposed for the image generation-output control apparatus, the second circuitry having one or more capabilities compatible with one or more capabilities of the first circuitry of the server, based on the output target image information and the first image processing data acquired from the server, and instructing the second image forming apparatus, by using second circuitry disposed for the image generation-output control apparatus, to perform an image forming operation based on the generated second image drawing information.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 3 is an example of JDF information of an example embodiment of the present invention;

FIG. 5 is an example of workflow information of an example embodiment of the present invention;

FIG. 7 is an example of a conversion table of an example embodiment of the present invention;

FIG. 8 is an example of RIP parameter of an example embodiment of the present invention;

Figure 1:
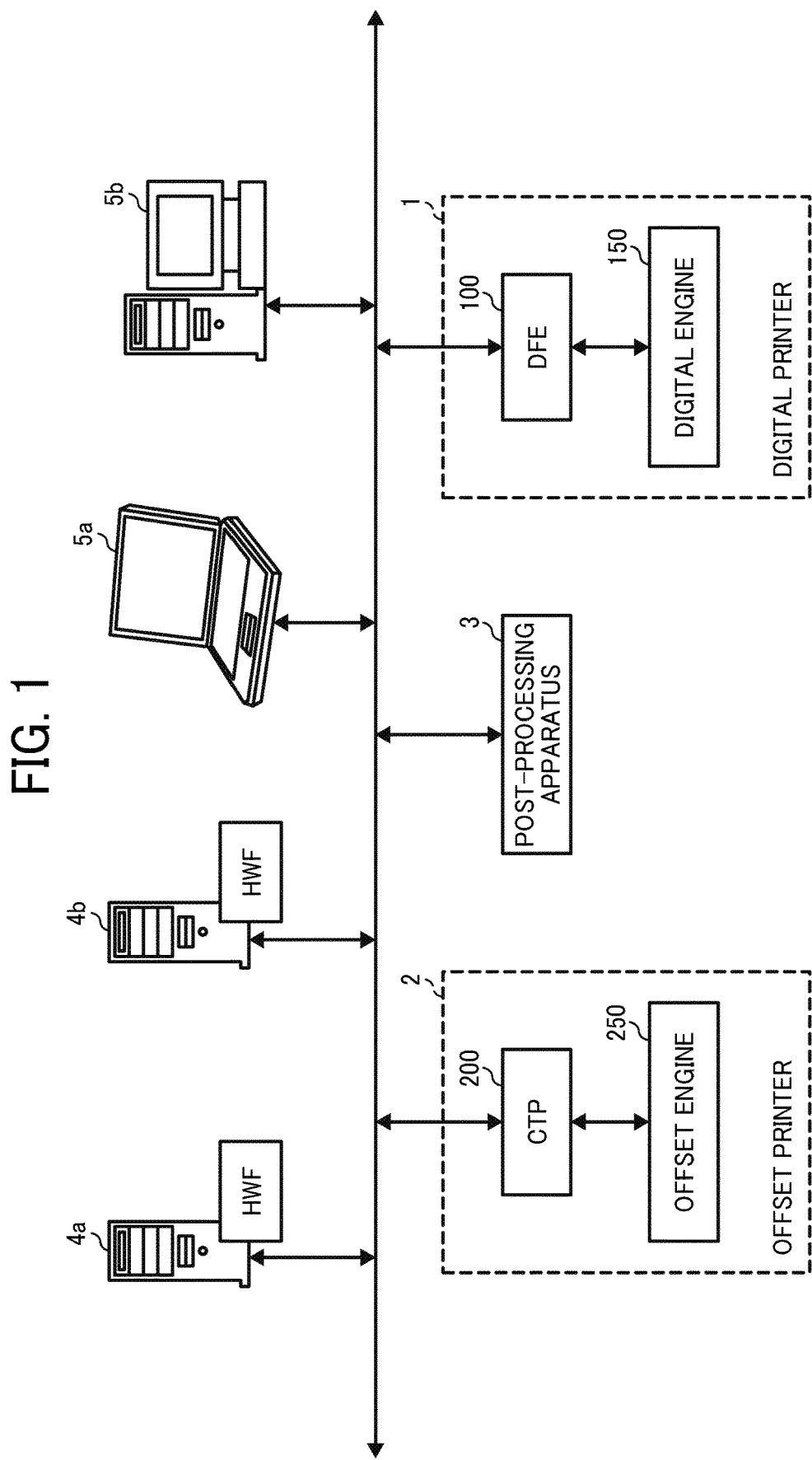
FIG. 1 is a schematic diagram illustrating a configuration of a system of an example embodiment of the present invention.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views illustrated in the drawings, specific terminology is employed for the sake of clarity, the present description is not limited to the specific terminology so selected and it is to be understood that each specific element includes all technical equivalents that operate in a similar manner and achieve a similar result. Referring now to the drawings, one or more apparatuses or systems according to an example embodiment are described hereinafter.

A description is given of an image processing system of an example embodiment of the present invention with reference to drawings. The image processing system includes, for example, an offset printer, and a digital printer, and a server, in which both of the offset printer and the digital printer can be controlled by the same server. Hereinafter, this image processing system is referred to a hybrid work flow (HWF) system. In the HWF system, a raster image processor (RIP) engine disposed in a digital front end (DFE) that controls the digital printer, and a raster image processor (RIP) engine disposed in the HWF server can employ the same type of RIP engine, and the digital printer executes a printing operation in this HWF system under the condition that the same type of RIP engine is disposed at the different apparatuses configuring the HWF system. In this disclosure, the same type of RIP engine may mean two or more RIP engines have substantially same processing capabilities, and thereby the two or more RIP engines are not required to have the exact same processing capabilities.

FIG. 1 is a schematic configuration of the HWF system of an example embodiment of the present disclosure. As illustrated in FIG. 1, the HWF system includes, for example, a digital printer 1, an offset printer 2, a post-processing apparatus 3, HWF servers 4a and 4b (hereinafter, collectively referred to HWF server 4 as required), and client terminals 5a and 5b (hereinafter, collectively referred to client terminal 5 as required) connectable or couplable with one to another via a network. In this description, the offset printer 2 is used as a first image forming apparatus, and the digital printer 1 is used as a second image forming apparatus.

The digital printer 1 is an example of printers that can generate and output images using an electrophotography method or an inkjet method without using a plate. The digital printer 1 includes, for example, a digital front end (DFE) 100, and a digital engine 150 as indicated in FIG. 1. The DFE 100 can be used as a controller for controlling an image generation and output, which means the DFE 100 can be used as an image generation-output control apparatus, in which the DFE 100 controls the digital engine 150 to perform a print output operation or printing operation. Further, the digital engine 150 can be used as a device for generating an image, which may be referred to as an image generator or print engine. Therefore, the DFE 100 includes a raster image processor (RIP) engine that generates raster data that is referred or used by the digital engine 150 when performing the print output operation. The raster data is used as drawing information or image drawing information.

The offset printer 2 is an example of printers that can generate and output images by using a plate. The offset printer 2 includes, for example, a computer-to-plate (CTP) 200, and an offset engine 250. The CTP 200 generates a plate based on the raster data. The offset engine 250 can perform an offset printing by using the plate generated by the CTP 200.

The post-processing apparatus 3 can perform various post-processing such as punching, stapling, and bookbinding to printed sheets output from the digital printer 1 and/or the offset printer 2. The HWF server 4 is a server installed with an HWF software program that is used to manage an image processing operation such as inputting of job data including target image data of a print output operation, processing of the print output operation, and post-processing. The HWF server 4 manages the above mentioned various processing using information generated by using a job definition format (JDF), which is referred to as "JDF information." The HWF server 4 can be used as a process execution control apparatus or a processing control apparatus.

The HWF server 4 further includes a raster image processor (RIP) engine in the HWF server 4. When the offset printer 2 performs an offset printing operation (i.e., print output operation), the RIP engine 420 in the HWF server 4 generates raster data, and transmits the generated raster data to the CTP 200, in which the RIP engine 420 generates the raster data as first image drawing information.

Further, when the digital printer 1 performs a printing operation (i.e., print output operation), the HWF server 4 transmits data to the DFE 100. Since the DFE 100 has the RIP engine 120 as described above, the digital printer 1 can perform the print output operation even when the HWF server 4 transmits print data that is not processed by the RIP processing in the HWF server 4 to the DFE 100.

As to the HWF system, the same print data may be used for the print output operation by the digital printer 1 and the print output operation by the offset printer 2. For example, one book can be printed by the print output operation of the digital printer 1 and the print output operation by the offset printer 2, in which the print output operation by the digital printer 1 and the print output operation by the offset printer 2 are performed independently. In this configuration, if the print output operation result by the digital printer 1 and the print output operation result by the offset printer 2 become different such as different fonts and color values, a user feels oddness on a printed product. Therefore, it is preferable that the print output operation result by the digital printer 1 and the print output operation result by the offset printer 2 become substantially the same one.

The differences of print output operation results by using different devices or apparatuses may occur due to the RIP processing. Therefore, by using the same RIP engine for data or information processing at the digital printer 1 and data or information processing at the offset printer 2, the differences between the print output operation result by the digital printer 1 and the print output operation result by the offset printer 2 can be reduced or minimized.

Specifically, the RIP engine disposed in the HWF server 4 is an engine that can process data or information for both of the digital printer 1 and the offset printer 2, and the RIP engine disposed in the HWF server 4 can perform common processes for the digital printer 1 and the offset printer 2. Further, the RIP engine disposed in the DFE 100 and the RIP engine disposed in the HWF server 4 employ the same type of RIP engine, which means that the RIP engine disposed in the DFE 100 is compatible with the RIP engine disposed in the HWF server 4.

With employing this configuration, the HWF server 4 and the DFE 100 are disposed with the same RIP engine having the same processing capability. Therefore, when the print output operation by the digital printer 1 is to be performed, the RIP processing by the HWF server 4 and the RIP processing by the DFE 100 can be selectively combined and performed.

An operator of the HWF system can operate the HWF server 4 by using the client terminal 5, in which the client terminal 5 can be used as an information processing terminal. The client terminal 5 can be any terminal devices or apparatuses such as a general personal computer (PC), but not limited hereto. The operator operates the client terminal 5 to display a graphic user interface (GUI) used for operating the HWF server 4, in which the GUI can be used to input data and setting the JDF information. The JDF information sets information for processing in the HWF system, and the JDF information may be referred to as process setting information.

Figure 2:
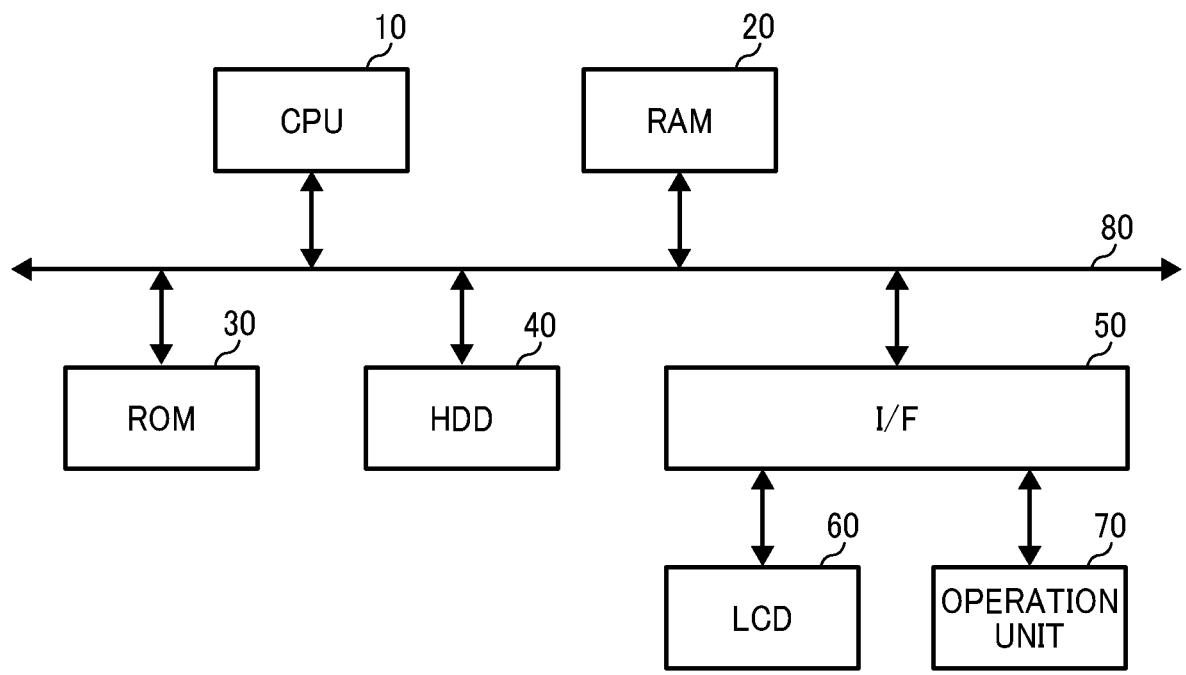
FIG. 2 is a schematic diagram illustrating a hardware configuration of an information processing apparatus of an example embodiment of the present invention.

A description is given of a hardware configuration of the DFE 100, the HWF server 4, and the client terminal 5 known as information processing apparatuses with reference to FIG. 2. As illustrated in FIG. 2, the information processing apparatus has a configuration similar to general servers and personal computers (PC). Specifically, the information processing apparatus includes, for example, a central processing unit (CPU) 10, a random access memory (RAM) 20, a read only memory (ROM) 30, a hard disk drive (HDD) 40, and an interface (I/F) 50 that are connectable or couplable by a bus 80. Further, a liquid crystal display (LCD) 60 and an operation unit 70 are connectable or couplable to the interface I/F 50.

The CPU 10 is a computing unit such as circuitry or a processor that controls the entire operations of the information processing apparatus. The RAM 20 is a volatile memory, to which information can be read and written with high speed, and the CPU 10 uses the RAM 20 as a working area when processing information or data. The ROM 30 is a non-volatile memory used as a read only memory, in which various programs such as firmware are stored. The HDD 40 is a non-volatile memory, to which information can be read and written. For example, the HDD 40 stores an operating system (OS), various control programs, and application programs.

The I/F 50 is connected or coupled to the bus 80, various units and networks, and controls the connection or coupling. The LCD 60 is a user interface that a user can check the status of the information processing apparatus visually. The operation unit 70 is a user interface such as a key board and a mouse that a user can input information to the information processing apparatus. Since the HWF server 4 is used as a server, a user interface such as LCD 60 and operation unit 70 can be omitted for the HWF server 4.

As to the above described hardware configuration of the information processing apparatus, the CPU 10 performs computing by loading programs stored in the ROM 30, the HDD 40, and/or an external memory such as an optical disk on the RAM 20 to configure a software control unit. With a combination of the software control unit and the hardware, functional blocks required for the DFE 100, the HWF server 4, and the client terminal 5 can be devised.

A description is given of the JDF information with reference to FIG. 3. FIG. 3 is an example of the JDF information. As illustrated in FIG. 3, the JDF information includes, for example, "job information" related to a job execution, "edit information" related to the raster data, and "finishing information" related to the post-processing. Further, the JDF information includes, for example, information of "RIP status," "RIP device designation," and "device designation."

As illustrated in FIG. 3, the "job information" includes information of, for example, "number of copies," "number of total pages," and "RIP control mode." The "number of copies" is information that designates the number of copies of an output target data to be output as a printed product. The "number of total pages" is information that designates the number of total pages included in one printed product. The "RIP control mode" indicates a control mode of the RIP processing, in which a "page mode" and a "sheet mode" can be designated for the "RIP control mode."

The "edit information" includes, for example, "orientation information," "print face information," "rotation," "enlarge/reduce," "image position," "layout information," "margin information," and "crop mark information." The "orientation information" is information that designates a printing orientation of a sheet such as "portrait (vertical)" and "landscape (horizontal)." The "print face information" is information that designates a to-be-printed face such as "duplex" and "one face."

The "rotation" is information that designates a rotation angle of an image of an output target data. The "enlarge/reduce" is information that designates a size change ratio of an image of an output target data. As to the "image position," "offset" is information that designates an offset of an image of an output target data, and "position adjustment information" is information that designates a position adjustment value of an image of an output target data.

The "layout information" includes, for example, "custom imposition arrangement," "number of pages," "page sequence information," and "creep position information." The "custom imposition arrangement" is information that designates an arrangement on a custom face. The "number of pages" is information that designates the number of pages printed in one sheet. For example, when images of two pages are condensed and printed on one face of a single sheet, information of "2 in 1" is designated. The "page sequence information" is information that designates a sequence of pages to be printed. The "creep position information" is information that designates a value related to an adjustment of a creep position.

The "margin information" is information that designates a value related to a margin such as a fit box and a gutter. The "crop mark information" includes, for example, "center crop mark information" and "corner crop mark information." The "center crop mark information" is information that designates a value related to a center crop mark. The "corner crop mark information" is information that designates a value related to a corner crop mark.

The "finishing information" includes, for example, "Collate information," "staple/binding information," "punch information," "folding information," "trimming," "output tray information," "input tray information," and "cover sheet information." The "Collate information" is information that designates a page-by-page printing or a document-by-document printing when one document is to be printed with a plurality of numbers of copies.

The "staple/binding information" is information that designates a process related to staple/binding. The "punch information" is information that designates a process related to punch. The "folding information" is information that designates a process related to folding of sheets. The "trimming" is information that designates a process related to trimming of sheets.

The "output tray information" is information that designates an output tray. The "input tray information" is information that designates an input tray. The "cover sheet information" is information that designates a process related to a cover sheet.

The "RIP status" is used as execution status information indicating whether each of internal processes included in the RIP processing is already executed. In an example case of FIG. 3, the internal processes of RIP processing includes image processing items such as "pre-flight," "normalize," "font," "layout," "mark," "CMM," "Trapping," "Calibration," and "Screening," and a processing status is set for each of the internal processes of RIP. In the example case of FIG. 3, the processing status of "NotYet" is set for the "RIP status" to indicate that "a concerned process is not yet processed". When each of the internal processes of RIP is executed, the status is updated to "Done" to indicate that "the concerned process is already processed."

The "RIP device designation" is information that designates a device to perform each of the internal processes of RIP processing. In the example case of FIG. 3, the "RIP device designation" designates the HWF server 4 or the DFE 100 to perform each of the internal processes of RIP processing. As illustrated in FIG. 3, each one of the internal processes of RIP processing is performed by setting any one of the "HWF server" and "DFE" for each of the internal processes of RIP processing. Further, when the "DFE" is set as the RIP device, information designating any one of a plurality of RIP engines installed in the DFE 100 can be designated such as "DFE (engine A)" and DFE (engine B).

The "device designation" is information that designates a device that executes a print job. In the example case of FIG. 3, the "digital printer" is designated to execute the print job. Further, the JDF information can include various information other than information illustrated in FIG. 3, which will described later in this disclosure.

The JDF information illustrated in FIG. 3 can be generated by an operator. For example, the operator operates the client terminal 5 to display a GUI of the HWF server 4, and then the operator sets various image processing items of the JDF information by using the GUI. The RIP engine disposed in the HWF server 4 and the RIP engine disposed in the DFE 100 can perform the RIP processing based on the JDF information. Further, the post-processing apparatus 3 can perform the post-processing based on the JDF information. Further, when a job is input to the HWF server 4 from an external system and software, the job assigned with JDF information may be input.

Figure 4:
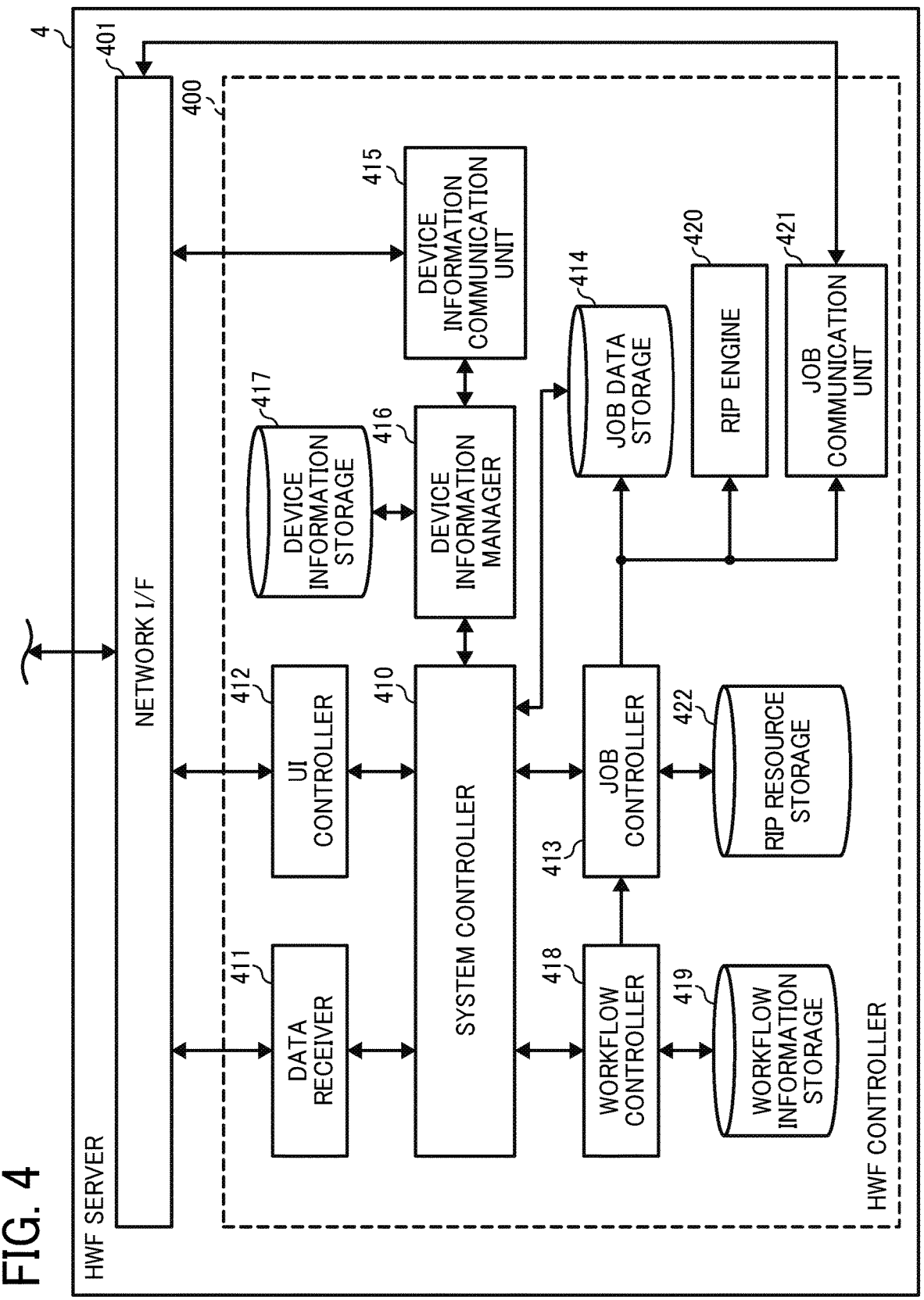
FIG. 4 is a schematic diagram illustrating a functional configuration of a HWF server of an example embodiment of the present invention.

A description is given of a functional configuration of the HWF server 4 with reference to FIG. 4. As illustrated in FIG. 4, the HWF server 4 includes, for example, a HWF controller 400, and a network interface (I/F) 401. The network I/F 401 is an interface used for communicating information between the HWF server 4 and other devices or apparatuses available for use via a network.

The HWF controller 400 manages various processing such as an acquisition of job data of a print target, a generation of a print job, a management of a workflow, and an allocation of job data to the digital printer 1 and the offset printer 2. A process that job data of a print target is input to the HWF server 4 and acquired by the HWF controller 400 is a process of inputting data to the HWF system. The HWF controller 400 can be implemented by installing a specific software program such as a HWF software program in the information processing apparatus.

As illustrated in FIG. 4, the HWF controller 400 includes, for example, a system controller 410, a data receiver 411, a user interface (UI) controller 412, a job controller 413, a job data storage 414, a device information communication unit 415, a device information manager 416, a device information storage 417, a workflow controller 418, a workflow information storage 419, a RIP engine 420, a job communication unit 421, and a RIP resource storage 422. The system controller 410 controls the HWF controller 400 entirely. Therefore, the system controller 410 transmits commands to each of the units in the HWF controller 400 to implement each of the above described functions or capabilities of the HWF controller 400. The data receiver 411 receives to-be-printed job data from other system, or to-be-printed job data input by an operation of an operator.

The UI controller 412 controls an operation operable by an operator via the client terminal 5. For example, a graphical user interface (GUI) used for operating the HWF server 4 is displayed on the client terminal 5, and the UI controller 412 acquires information of an operation work to the GUI displayed on the client terminal 5 via a network.

The UI controller 412 reports information of the operation acquired via the network to the system controller 410. The display of GUI on the client terminal 5 can be implemented by executing a software program installed in the client terminal 5, or by supplying information to the client terminal 5 from the UI controller 412 via the network.

The operator operates the GUI displayed on the client terminal 5 to select job data to be input as a print target. Then, the client terminal 5 transmits the selected job data to the HWF server 4, and then the data receiver 411 acquires the selected job data. The system controller 410 registers the job data acquired by the data receiver 411 to the job data storage 414.

When the job data is to be transmitted from the client terminal 5 to the HWF server 4, the job data is generated in the client terminal 5 based on document data and/or image data selected at the client terminal 5, and then the job data is transmitted to the HWF server 4. The job data is described, for example, by page description language (PDL) format such as portable document format (PDF) and PostScript.

Further, the client terminal 5 can transmit data of a print target to the HWF server 4 by using an application specific data format or a general image data format. In this configuration, the system controller 410 instructs the job controller 413 to generate job data based on the acquired data. The job controller 413 generates the job data based on the data of print target by using the RIP engine 420.

As described above, the data of print target registered in the job data storage 414 is PDL information. The PDL information can be, for example, primary data generated from the data of print target, or intermediate data, which is processed to the middle of the RIP processing. These information can be used as information of an output target image (i.e., output target image information). For example, the intermediate data can be stored in the job data storage 414 when the job data is processed to the middle of the RIP processing that is already started in the HWF server 4, or when the job data is registered in the HWF server 4 with a condition of the intermediate data. Hereinafter, the "PDL information" indicates primary data that is not yet processed by the RIP processing, and the intermediate data indicates data that is processed to the middle of the RIP processing (i.e., processing-not-completed data) in this disclosure.

Further, as described above, the JDF information illustrated in FIG. 3 can be set and generated by an operation of an operator to the GUI displayed on the client terminal 5. Further, when a job is input to the HWF server 4 from an external system and software, the JDF information may be assigned to the job. The generated or acquired JDF information can be received by the data receiver 411 with the PDL information as the job data. The system controller 410 correlates the acquired JDF information and PDL information, and registers the JDF information and PDL information to the job data storage 414.

In this disclosure, attribution information indicating job contents is described by using the JDF information, but not limited hereto. For example, the attribution information indicating job contents can be described by using other format such as print production format (PPF).

Further, the system controller 410 can divide the received job data as required based on an operation of an operator to a GUI displayed on the client terminal 5. For example, the system controller 410 can divide the received job data into a discrete unit of printing portion such as a unit of "page,"

and each one of the divided job data can be registered in the job data storage 414 as sub job data, in which the job data is configured by the plurality of the sub-job data.

When an output-destination device is selected for each of the sub job data by an operation of an operator to a GUI displayed on the client terminal 5, the operator's selection result is correlated with the sub-job data, and then stored in the job data storage 414. The output-destination device can be set selectively for each of the sub job data. For example, the digital printer 1 can be selected for printing sub job data corresponding to a cover of the received job data, and the offset printer 2 can be selected for printing sub-job data corresponding to a main contents of the received job data.

The device information manager 416 acquires information of available devices or apparatuses included in the HWF system such as the digital printer 1, the offset printer 2, the post-processing apparatus 3 or the like, and the device information manager 416 stores information of the available devices or apparatuses in the device information storage 417, and manages the information of the available device or apparatuses. The information of available devices includes, for example, a network address allocated to each device when the device is connected or coupled to the network, and device capability information of each device. The device capability information includes, for example, printing speed, available post-processing capability, and operational condition.

The device information communication unit 415 can acquire information of the available devices included in the HWF system at regular intervals via the network I/F 401. With this configuration, the device information manager 416 can update information of the available devices stored in the device information storage 417 at regular intervals. Therefore, even if the information of the available devices changes over time, the information stored in the device information storage 417 can be updated and maintained at the latest status.

The workflow controller 418 determines an execution sequence of a plurality of processes to be executed for the job data registered in the job data storage 414 in the HWF system, and stores information of the execution sequence in the workflow information storage 419. Based on the execution sequence set for each of processes in a workflow in advance, the workflow controller 418 can control the execution sequence, in which when one process completes, the sequence proceeds to the next process.

The workflow information stored in the workflow information storage 419 specifies the execution sequence of each of processes executable in the HWF system, in which the processes are sequentially arranged based on the designated execution sequence. FIG. 5 is an example of workflow information. Further, parameters, which are used when each of the processes is executed, can be designated as the JDF information as above described. The workflow information storage 419 registers the workflow information in advance based on an operation of an operator to the GUI displayed on the client terminal 5.

An execution instruction of the job data, registered in the HWF server 4, is reported to the system controller 410 via the UI controller 412 based on an operation of an operator to the GUI displayed on the client terminal 5. With this configuration, the system controller 410 can select the above described output-destination device.

When the output-destination device is selected by using the GUI displayed on the client terminal 5 as described above, the system controller 410 selects the output-destination device based on a designation of the output-destination device. Further, the output-destination device can be selected automatically based on a comparison of job contents and a device property.

When the output-destination device is selected automatically based on the comparison of job contents and the device property, the system controller 410 acquires information of device available for use from the device information manager 416. When the output-destination device is determined as above described, the system controller 410 assigns information indicating the determined output-destination device to the JDF information.

After determining the output-destination device, the system controller 410 instructs the workflow controller 418 to execute a job. In this process, the workflow information, registered in the workflow information storage 419 in advance based on then operation of the operator, can be used. Further, a new workflow information can be generated and then used based on contents set by the operator.

After receiving the execution instruction from the system controller 410, the workflow controller 418 instructs the job controller 413 to execute each of the processes based on the designated execution sequence of the designated workflow information or the newly generated workflow information. Therefore, the workflow controller 418 can be used as a process execution controller.

After receiving the execution instruction, the job controller 413 inputs the above described PDL information and JDF information to the RIP engine 420 to execute the RIP processing. The JDF information includes information that indicates which one of the HWF server 4 and the DFE 100 is used for processing each of internal processes of the RIP processing using the RIP engine.

The job controller 413 refers or checks allocation information of the RIP processing included in the JDF information. If one process designated by the workflow controller 418 is a process to be executed by the HWF server 4, the job controller 413 instructs the RIP engine 420 to execute the designated one process. Based on the instruction from the job controller 413, the RIP engine 420 executes the RIP processing based on parameters designated in the JDF information.

After executing the RIP processing, the RIP engine 420 updates the RIP status of each of the processes executed by the RIP processing. With this configuration, the status of each of the internal processes of the RIP processing executed by the HWF server 4 is changed from "NotYet" to "Done." The RIP engine 420 can be used as a control-side image drawing information generator, a control-side drawing information generator or a first image drawing information generator.

The RIP-executed result data generated by executing the RIP processing is any one of PDL information, intermediate data, and raster data. Any one of the PDL information, intermediate data, or raster data can be generated depending on the internal process of the RIP processing. Specifically, as the sequence proceeds, the intermediate data is generated from primary data such as PDL information, and the raster data is generated as final data from the intermediate data. The RIP-executed result data is correlated with a being-executed job, and stored in the job data storage 414.

When each one of the internal processes of RIP processing is completed, the RIP engine 420 reports the completion of each one of the internal processes to the job controller 413, and the job controller 413 reports the completion of each one of the internal processes to the workflow controller

418. With this configuration, the workflow controller 418 starts to control a subsequent or next process based on the workflow information.

If the job contents received from the workflow controller 418 is a request to the other system, the job controller 413 inputs job data, compatible with the other system, to the job communication unit 421, and instructs the job communication unit 421 to transmit the job data. If the job data is to be transmitted to the offset printer 2, the job data of a print target is converted to the raster data, and then the raster data is transmitted to the offset printer 2 as the job data.

Further, if the job data is to be transmitted to the digital printer 1, the job controller 413 inputs the job data to the job communication unit 421 while designating a RIP engine having capabilities compatible with the RIP engine 420 from a plurality of the RIP engines included in the DFE 100. With this configuration, the job communication unit 421 transmits the job data to the DFE 100 by designating the RIP engine that is the same type of the RIP engine 420.

The job communication unit 421 transmits the job data such as a package of PDL information and JDF information or a package of intermediate data and JDF information to the DFE 100. Further, the PDL information or intermediate data can be transmitted to the DFE 100 separately from the JDF information, in which the PDL information or intermediate data can be prepared as external resource data, and the JDF information can include universal resource locators (URL) indicating a storage area of the PDL information or a storage area of intermediate data. In this configuration, the DFE 100 that receives the JDF information can access the storage area specified by the URL to acquire the PDL information or intermediate data.

Figure 6:
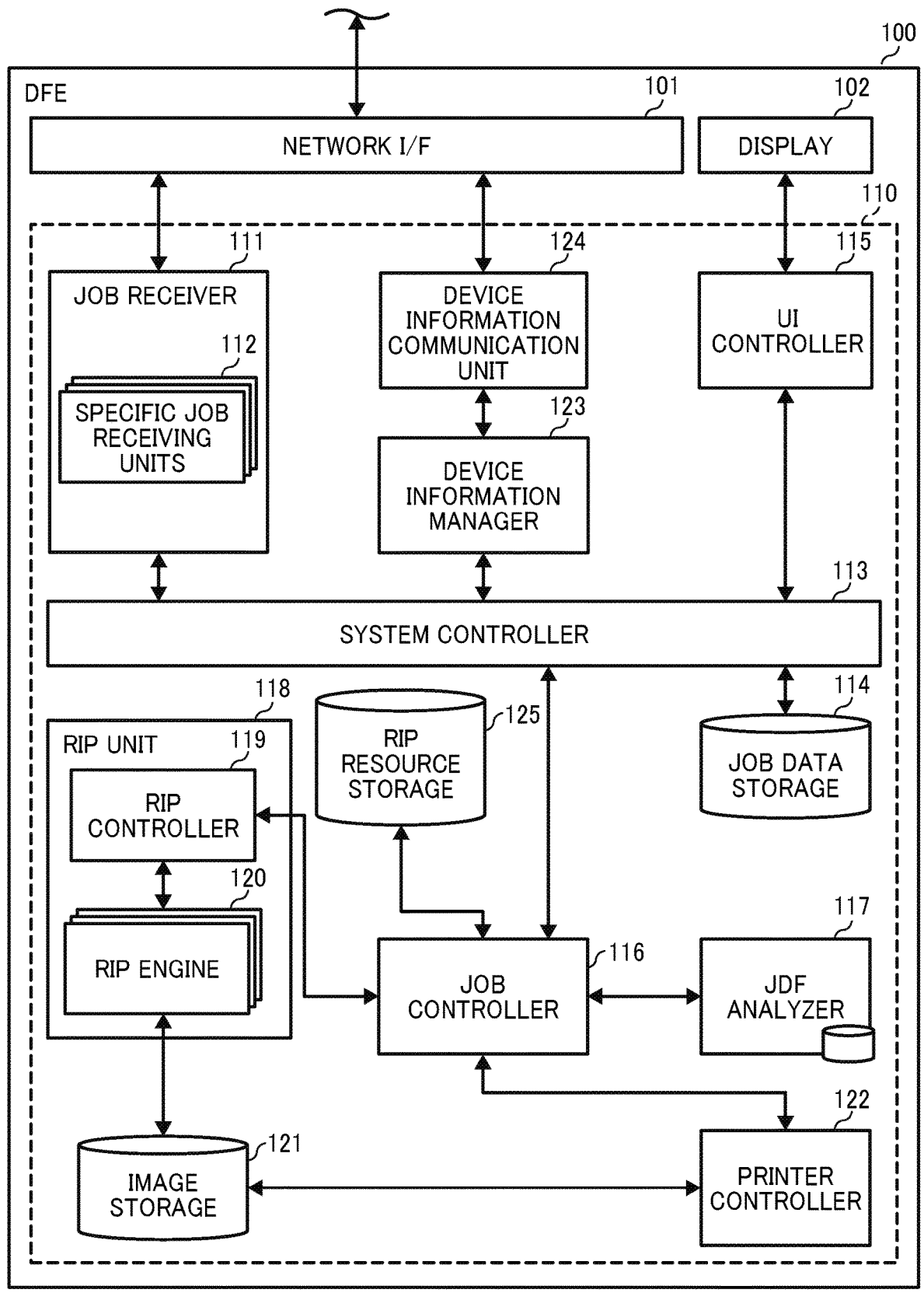
FIG. 6 is a schematic diagram illustrating a functional configuration of a DFE of an example embodiment of the present invention.

A description is given of a functional configuration of the DFE 100 with reference to FIG. 6. When the DFE 100 receives job data from the HWF server 4, the DFE 100 controls the received job, an execution of the RIP processing, and the digital engine 150. The HWF server 4 transmits the job data to the DFE 100 and instructs the DFE 100 to execute a print output operation by using the digital engine 150. Therefore, the DFE 100 can be used as a device to provide digital printing capability to the HWF server 4.

The job control capability performable by the DFE 100 is a process of controlling a series of processes such as a reception of job data, an analysis of JDF information, a generation of raster data, and a print output operation by the digital engine 150. The execution control of the RIP processing is a process of controlling the RIP engine to execute the RIP processing based on information generated by the analysis of the JDF information and PDL information.

The information generatable by analyzing the JDF information means that information used for the RIP processing is extracted from the JDF information (FIG. 3), and is then converted to a data format processable by the DFE 100, which is referred to "job attribute in DFE" in this disclosure. By executing the RIP processing by using the job attribute in DFE and the PDL information, the intermediate data and raster data can be generated.

The control capability of the digital engine 150 is a process of transmitting raster data and at least a part of the above described job attribute in DFE to the digital engine 150, and executing the print output operation by the digital engine 150. These capabilities can be implemented by each of units illustrated in FIG. 6. Each of the units illustrated in FIG. 6 can be implemented by activating the hardware (FIG. 2) by loading programs stored in the ROM 30 on the RAM 20 and executing the loaded programs by using the CPU 10.

As illustrated in FIG. 6, the DFE 100 includes, for example, a network I/F 101, a DFE controller 110, and a display 102. The DFE controller 110 includes, for example, a job receiver 111 including a plurality of specific job receiving units 112, a system controller 113, a job data storage 114, a UI controller 115, a job controller 116, a JDF analyzer 117, a RIP unit 118, a RIP controller 119, a RIP engine 120, an image storage 121, a printer controller 122, a device information manager 123, and a device information communication unit 124, and a RIP resource storage 125.

The DFE 100 can include a plurality of RIP engines therein, and each of the plurality of RIP engines is compatible with each of RIP engines of other available devices. Specifically, each of the plurality of RIP engines of the DFE 100 is compatible with each of the RIP engines of other available devices that may transmit job data to the DFE 100 in the HWF system. Since the HWF servers 4a and 4b include different RIP engines, a plurality of the RIP engines that compatible with the RIP engines of HWF servers 4a and 4b is disposed in the DFE 100.

The job receiver 111 includes the plurality of specific job receiving units 112. In this configuration, each of the specific job receiving units 112 receives job data from the HWF server 4 via the network I/F 101, and each of the plurality of specific job receiving units 112 respectively corresponds to each of the plurality of RIP engines disposed in the DFE 100. In this configuration, the specific job receiving unit 112 can be used as a specific receiver.

As described above, when job data is transmitted from the HWF server 4 to the DFE 100, the corresponding RIP engine 120 is designated, and the job data is transmitted to the corresponding RIP engine 120. Therefore, the specific job receiving unit 112 in the job receiver 111, corresponding to the designated RIP engine 120, can receive the job data.

In the above described configuration, the job data can be input to the DFE 100 from the HWF server 4 via a network. Further, the job data can be input to the DFE 100 via a portable memory such as a universal serial bus (USB) memory. In this disclosure, the JDF information is included in the job data. If the JDF information is not included in the job data, the job receiver 111 generates dummy JDF information, and assigns the dummy JDF information to the job data.

The specific job receiving units 112 can be disposed for each of the above described RIP engines 120. Further, each of the specific job receiving unit 112 can be used as a virtual printer set with job contents in advance. Specifically, each of the specific job receiving units 112 can be disposed for the corresponding RIP engine 120 disposed in the DFE 100 and job contents, and then, by designating any one of the plurality of specific job receiving units 112, the corresponding job can be executed with the contents set in advance.

Further, as to the one or more example embodiment of the present disclosure, the specific job receiving unit 112 can be set with a "pass-through mode." As illustrated in FIG. 6, the DFE 100 can include the JDF analyzer 117, independently from the RIP engine 120, to perform an analysis of JDF information. When the "pass-through mode" is activated, the RIP engine 120 performs an analysis of the JDF information while the analysis of JDF information by the JDF analyzer 117 is not activated.

By employing this configuration having the "pass-through mode," JDF information using a format not-processable by the JDF analyzer 117 can be used, a RIP engine that is difficult to include JDF analysis capability outside the RIP engine can be employed for the HWF server 4 and the DFE 100. As to the an example embodiment, the "pass-through mode" may be used when a plurality of processes is distributed between the RIP engine 420 disposed in the HWF server 4 and the RIP engine 120 disposed in the DFE 100, in which the RIP engine 120 and the RIP engine 420 employs the same type of engine having the same capabilities. The RIP engine 120 can be used as an output-side image drawing information generator, an output-side drawing information generator or a second image drawing information generator, in which the RIP engine 120 generates the raster data as second image drawing information.

When the RIP processing is performed by the HWF server 4 and the DFE 100 as the distributed processing, it is preferable that the RIP processing is performed as one sequential processing as much as possible without being perceived as separate processing by the HWF server 4 the DFE 100. Therefore, when data that is processed to the middle of the entire processing by the HWF server 4 is input to the DFE 100, it is preferable that the processing is performed by the DFE 100 as a process being continued from the HWF server 4 by omitting the JDF analysis process that is performed normally when unprocessed job data is input to the DFE 100.

As to the an example embodiment, the RIP engine having the same capabilities is disposed in each of the HWF server 4 and the DFE 100, with which the above described RIP processing can be controlled and performed preferably. Further, in this configuration, it is preferable that data processed by one RIP engine is transferred to another RIP engine as it is, which can be preferably implemented by using the "pass-through mode."

The system controller 113 stores the job data received by the specific job receiving unit 112 in the job data storage 114, or transfers the job data received by the specific job receiving unit 112 to the job controller 116. If the DFE 100 is devised to store the job data, the system controller 113 stores the job data in the job data storage 114. Further, if the JDF information includes a description whether the job data is to be stored in the job data storage 114 or not, the system controller 113 performs the processing in line with the description.

The job data is stored in the job data storage 114, for example, when a preview of print contents is performed by the DFE 100. In this case, the system controller 113 acquires data of a print target included in the job data, which is PDL information and intermediate data, from the job data storage 114 to generate preview data, and transfers the preview data to the UI controller 115. With this configuration, the UI controller 115 controls the display 102 to display a preview of the print contents on the display 102.

When the preview data is to be generated, the system controller 113 transfers the data of print target to the job controller 116, and requests the job controller 116 to generate the preview data. The job controller 116 transfers the data of print target to the RIP unit 118 to generate the preview data, and the job controller 116 receives the generated preview data, and transfers the generated preview data to the system controller 113.

Further, when an operator changes the JDF information for the DFE 100, the job data is stored in the job data storage 114. In this case, the system controller 113 acquires the JDF information from the job data storage 114, and transfers the JDF information to the UI controller 115. With this configuration, the JDF information of the job data is displayed on the display 102, and the operator can change the JDF information by performing an operation on the display 102.

When the operator changes the JDF information by operating the DFE 100, the UI controller 115 receives the changed information, and reports the changed information to the system controller 113. The system controller 113 applies the received changed information to the target JDF information to update the target JDF information, and stores the updated target JDF information in the job data storage 114.

When the system controller 113 receives the job execution instruction, the system controller 113 reads out the job data stored in the job data storage 114, and transfers the job data to the job controller 116. The job execution instruction can be input from the HWF server 4 via the network or the job execution instruction can be input by an operation of an operator to the DFE 100. Further, if the JDF information is set with, for example, the execution time, the system controller 113 transfers the job data stored in the job data storage 114 to the job controller 116 when the set execution time has come.

The job data storage 114 is a memory or a storage area to store the job data, which can be devised, for example, by the HDD 40 illustrated in FIG. 2. Further, the job data can be stored in a memory or a storage area connected to the DFE 100 via a universal serial bus (USB) interface, or can be stored in a memory device connected or coupled via a network.

As described above, the UI controller 115 controls the display 102 to display information, and receives an operation of an operator to the DFE 100. When the above described editing process is performed to the JDF information, the UI controller 115 interprets the JDF information, and displays contents of the print job on the display 102.

The job controller 116 controls the job execution when the job execution instruction is transmitted from the system controller 113. Specifically, the job controller 116 controls the JDF analysis process by the JDF analyzer 117, the RIP processing by the RIP unit 118, and the control of the digital engine 150 by the printer controller 122. Therefore, the job controller 116 can be used as an output-side image drawing information generation controller that controls the output-side image drawing information generation process, in which the job controller 116 instructs the RIP unit 118, used as the output-side image drawing information generator, to generate the image drawing information.

When the job controller 116 receives the job execution instruction from the system controller 113, the job controller 116 inputs the JDF information included in the job data to the JDF analyzer 117 to request a conversion of JDF. The JDF conversion request is a request for converting the JDF information described by a format used by an original or initial generator of the JDF information to a format decodable or processable by the RIP unit 118. Therefore, the JDF analyzer 117 can be used as a process setting information converter.

By contrast, when the above described "pass-through mode" is designated, the job controller 116 acquires the JDF information included in the job data from the system controller 113, and inputs the acquired JDF information at it is to the RIP unit 118. The designation of "pass-through mode" can be described in the JDF information by using the specific job receiving unit 112. Further, when the "pass-through mode" is designated by the specific job receiving unit 112, a "page mode" and a "sheet mode" can be also designated depending on the designated RIP engine 120.

The JDF analyzer 117 converts the JDF information described with the format used by the original generator to the format decodable or processable by the RIP unit 118. The JDF analyzer 117 retains a conversion table therein, and extracts information required for the RIP unit 118 from information included in the JDF information, and converts a description format of the extracted information based on the conversion table. With this configuration, the above described job attribute in DFE can be generated.

FIG. 7 is an example of a conversion table retainable by the JDF analyzer 117. As illustrated in FIG. 7, the conversion table correlates a description format of JDF information and a description format of job attribute in DFE. For example, information of "number of copies" illustrated in FIG. 3 is described as "A-Amount" in the original or initial JDF information, and "A-Amount" is converted to a description of "number of copies" when generating the job attribute in DFE.

The job attribute in DFE can be generated by the JDF analyzer 117 based on the conversion table of FIG. 7. The information described in the job attribute in DFE includes, for example, "job information," "edit information," and "finishing information" indicated in FIG. 3.

The JDF analyzer 117 sets the "RIP control mode" to the job attribute in DFE when generating the job attribute in DFE. The "RIP control mode" includes the "page mode" and "sheet mode." The JDF analyzer 117 assigns or allocates the "RIP control mode" based on a type of the specific job receiving unit 112 that has received the job data, job contents, and HWF software program installed in the HWF server 4 used as a transmission source of the job data.

In the configuration described in this specification, condensed printing for a print job can be set by using the "page mode." The "RIP control mode" will be described later in detail.

Based on the job attribute in DFE generated by the JDF analyzer 117, the job controller 116 generates "RIP parameter," and transfers the "RIP parameter" to the RIP controller 119 in the RIP unit 118 to execute the RIP processing. With this configuration, the RIP unit 118 can execute the RIP processing based on the "RIP parameter."

FIG. 8 is an example of one set of RIP parameters of an example embodiment. The RIP parameters include, for example, "type of input/output data," "data reading information," and "RIP control mode" as header information. The "type of input/output data" designates the type of input/output data such as JDF, PDL or the like. The designatable format is, for example, JDF, PDL, text format, extension of image data, and intermediate data.

The "data reading information" includes information of a designation method and a designation position of reading position and writing position of the input/output data. The "RIP control mode" is information that designates the "page mode" and "sheet mode." The header information further includes, for example, information of "unit" used in the RIP parameter, and information of compression method of data.

The "input/output image information" includes, for example, "information of output image," "information of input image," and "information of image processing." The "information of output image" includes information of, for example, format, resolution, size, color separation, color shift, and page orientation of output image data. The "information of input image" includes information of, for example, format, resolution, page area, and color settings of input image data. The "information of image processing" includes information of, for example, an offset of enlargement/reduction algorism, an object area, and an offset of halftone.

The "PDL information" is information related to PDL information used for the RIP parameter. The "PDL information" includes information of, for example, "data area," "size information," and "data arrangement method." In this disclosure, the PDL information is data of print target in a job, and includes intermediate data. The "data area" designates information of an area where the PDL information is stored. The "size information" designates a data size of the PDL information. The "data arrangement method" designates a data arrangement pattern in a memory storing the PDL information such as "little big endian" and "big endian."

When the "pass-through mode" is used, the job controller 116 generates the RIP parameter based on the JDF information and PDL information or the JDF information and intermediate data. In this case, each of the image processing items configuring the RIP parameter is set with information that can be used to refer corresponding image processing item in JDF information.

As illustrated in FIG. 8, the RIP parameter includes the "RIP control mode." The RIP controller 119 controls the RIP engine 120 based on the "RIP control mode." Therefore, the sequence is set based on the "RIP control mode." As above described, the "page mode" and "sheet mode" can be set as the "RIP control mode."

The "page mode" and "sheet mode" are performed to a plurality of pages to generate raster data. As to the "page mode," the RIP processing is performed for each page of the plurality of pages, and then raster data condensing the plurality of RIP-processed pages on one single sheet is generated. As to the "sheet mode," a plurality of pages are condensed on a single sheet at first, and then the RIP processing is performed for each part (i.e., each page) on the single sheet to generate raster data condensing the plurality of pages on the single sheet.

Further, when the "pass-through mode" is set, the "pass-through mode" can be designated in the "RIP control mode." However, this is just one example. The "pass-through mode" can be described in any image processing items other than the "RIP control mode."

Further, the job controller 116 sets "RIP engine identification information" in the RIP parameter. The "RIP engine identification information" is information for identifying each one of the plurality of the RIP engines 120 included in the RIP unit 118. In this configuration, the same RIP engine is used in the HWF server 4 as the RIP engine 420, and in the DFE 100 as the RIP engine 120.

Therefore, the JDF information includes information for designating the specific job receiving unit 112 as described above, and the designated specific job receiving unit 112 receives the job data. Each one of the specific job receiving units 112 corresponds to any one of the RIP engines 120, and identification information of the corresponding RIP engine 120 is added to the received JDF information. Based on the identification information of the RIP engine 120 added to the JDF information, the job controller 116 adds the "RIP engine identification information" to the RIP parameter.

As to the RIP unit 118, the RIP controller 119 controls the plurality of RIP engines 120 to perform each of the internal processes of RIP processing based on the input RIP parameters to generate raster data. As to the HWF system of the an example embodiment, since the RIP controller 119 may receive a plurality of print jobs from a plurality of different HWF servers 4, the RIP controller 119 is designed to process the plurality of print jobs receivable from the plurality of different HWF servers 4.

Each of the plurality of different HWF servers 4 may process data of print job differently. For example, the above described "page mode" and "sheet mode" of the "RIP control mode" may be differently set for each of the different HWF servers 4. When one of the RIP engine 120 is set with the "page mode," and the condensed printing is to be performed by the RIP engine 120, original page data corresponding to the condensing numbers are designated sequentially.

By contrast, when another one of the RIP engines 120 is set with the "sheet mode," and the condensed printing is to be performed by another RIP engine 120, all of original page data before performing the condensing are designated, and then the RIP processing is performed for all of the original page data. Therefore, the methods of designating parameters for the RIP engine 120 may become different for each of the different RIP engines 120. This difference is not limited to the "RIP control mode." For example, differences may occur due to a difference of format and processing of original data such as a difference of processing of the margin of the original data.

To cope with the differences of the RIP engines 120, the RIP controller 119 of the an example embodiment performs a conversion process of parameters designated to a specific RIP engine 120 depending on the specific RIP engine 120 that is to perform a specific RIP processing. For example, when data of the "page mode" is input to the specific RIP engine 120 set with the "sheet mode," parameters described by the "page mode" are converted to parameters described by the "sheet mode." The capabilities of the RIP engine 120 will be described later in detail.

The image storage 121 is a memory or a storage area to store raster data generated by the RIP engine 120. The image storage 121 can be devised, for example, by the HDD 40 illustrated in FIG. 2. Further, the image storage 121 can be a memory or a storage area connected to the DFE 100 via a universal serial bus (USB) interface, or can be a memory device connected or coupled via a network.

The printer controller 122 is connected or coupled to the digital engine 150. The printer controller 122 reads the raster data stored in the image storage 121, and transmits the raster data to the digital engine 150 to execute a print output operation. Further, the printer controller 122 acquires the finishing information included in the job attribute in DFE from the job controller 116 to control a finishing process.

The printer controller 122 can communicate information with the digital engine 150 to acquire information of the digital engine 150. For example, when CIP4 standard is used, DevCaps standard is defined as the JDF information standard for communicating device property information with a printer. Further, printer information can be collected by using a communication protocol such as simple network management protocol (SNMP) and a database such as management information base (MIB).

The device information manager 123 manages the device information such as information of the DFE 100 and the digital engine 150. The device information includes, for example, information of the RIP engines 120 included in the RIP unit 118, and information of the specific job receiving units 112 in the job receiver 111. Further, the information of the specific job receiving units 112 includes information of the above described "pass-through mode."

The device information communication unit 124 communicates the device information with the HWF server 4 via the network I/F 101 using a compatible format such as MIB and job messaging format (JMF). With this configuration, the device information communication unit 415 of the HWF server 4 can acquire the device information from the DFE 100, with which information of the RIP engines 120 and information of the specific job receiving units 112 included in the DFE 100 can be set to a GUI settable and displayable on the client terminal 5.

As to the DFE 100, when the printer controller 122 controls the digital engine 150, and then a print output operation is completed, the system controller 113 recognizes the completion of the print output operation via the job controller 116. Then, the system controller 113 reports the completion of a job to the HWF server 4 via the job receiver 111. With this configuration, the job communication unit 421 of the HWF server 4 receives a report of the completion of the job.

As to the HWF server 4, the job communication unit 421 transfers the report of the completion of the job to the job controller 413, and then the job controller 413 reports the completion of the job to the workflow controller 418. The transmission of the job data from the HWF server 4 to the DFE 10 is executed by the workflow controller 418 based on a workflow information.

When the completion of the job by the DFE 100 is recognized, the workflow controller 418 controls a next process based on the workflow information. A process to be performed after performing the print output operation by the DFE 100 is, for example, a post-processing by the post-processing apparatus 3.

Figure 9:
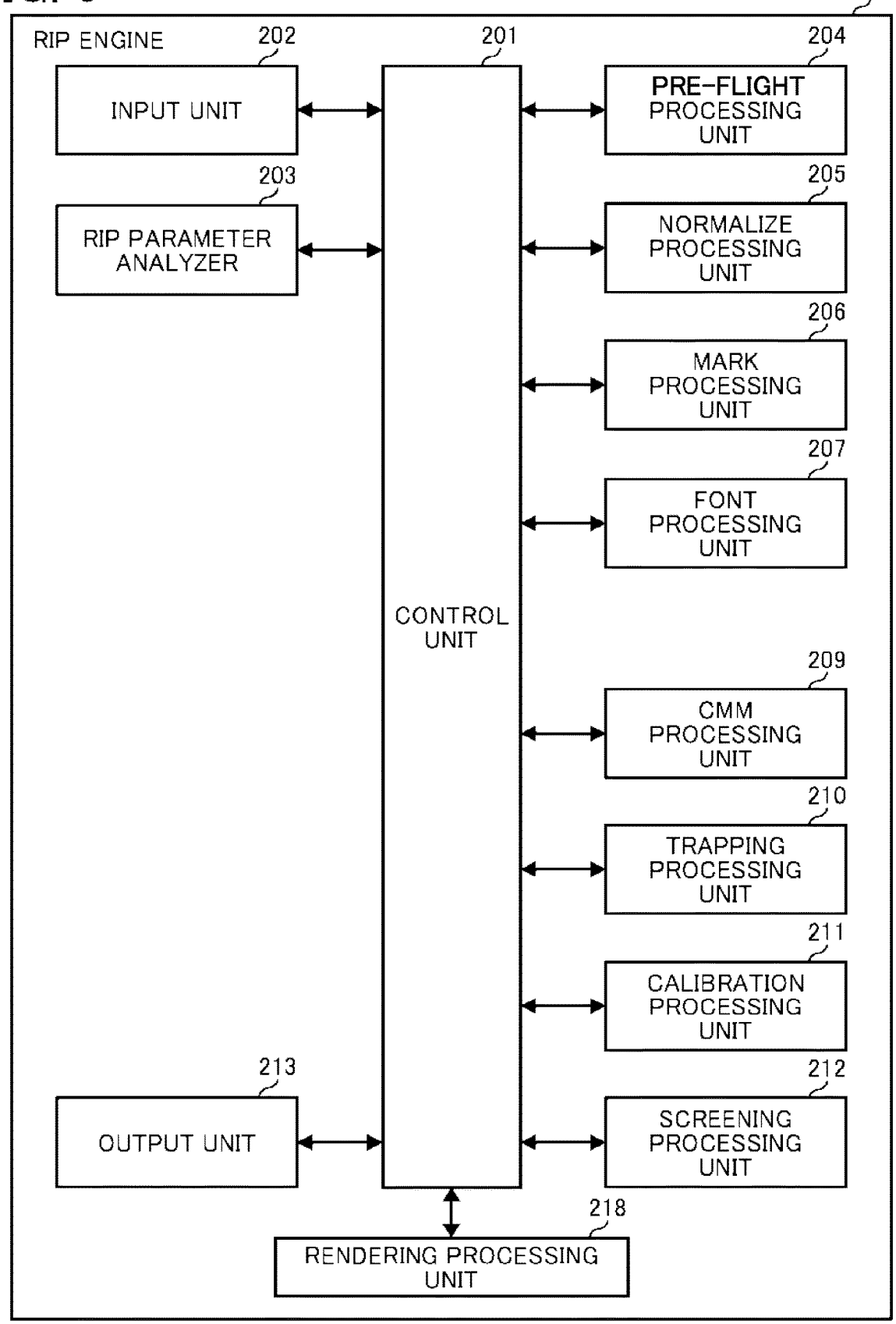
FIG. 9 is a schematic diagram illustrating a functional configuration of a RIP engine of an example embodiment of the present invention.

A description is given of a functional configuration of the RIP engine of the example embodiment. FIG. 9 is a schematic diagram illustrating a functional configuration of the RIP engine 120 having the JDF analyzer 117 used for the JDF analysis process. As above described, the RIP engine 120 can be a software module that executes each of the internal processes of RIP processing to generate raster data based on the RIP parameter illustrated in FIG. 8. The RIP engine 120 can be, for example, an Adobe PDF printing engine (APPE) provided by Adobe systems, but not limited hereto.

As illustrated in FIG. 9, the RIP engine 120 is configured by a control unit 201 and other units. The other units can be employed as extended units, which can be extended by a vendor. The control unit 201 executes the RIP processing by using various capabilities that can be devised as the extended units. Specifically, as illustrated in FIG. 9, the RIP engine 120 includes the control unit 201 and the extended units such as an input unit 202, a RIP parameter analyzer 203, a pre-flight processing unit 204, a normalize processing unit 205, a mark processing unit 206, a font processing unit 207, a color management module (CMM) processing unit 209, a trapping processing unit 210, a calibration processing unit 211, a screening processing unit 212, an output unit 213, and a rendering processing unit 218.

The input unit 202 receives an initialization request, and an execution request for the RIP processing, and reports the request to the control unit 201. When the initialization request is received, the above described RIP parameter is also input to the control unit 201. When the control unit 201 receives the initialization request, the control unit 201 inputs the RIP parameter, received at the same time with the initialization request, to the RIP parameter analyzer 203. Then, the control unit 201 acquires an analysis result of the RIP parameter, computed by the RIP parameter analyzer 203, and determines an activation sequence of each of the extended units included in the RIP engine 120 when the RIP processing is performed. Further, the control unit 201 determines a data format generatable by performing the RIP processing, in which the data format can be any one of the raster image, preview image, PDF, and intermediate data.

Further, when the control unit 201 receives the execution request for the RIP processing from the input unit 202, the control unit 201 activates each of the extended units included in the RIP engine 120 based on the activation sequence that is determined when the control unit 201 receives the initialization request. The pre-flight processing unit 204 checks validity of input PDL data contents. If the pre-flight processing unit 204 detects an illegal PDL attribute, the pre-flight processing unit 204 reports the illegal PDL attribute to the control unit 201. When the control unit 201 receives this report, the control unit 201 reports the illegal PDL attribute to an external module such as the RIP controller 119 and the job controller 116 via the output unit 213.

The pre-flight processing checks whether attribute information that disenables a processing by other modules included in the RIP engine 120 is included in the received data. For example, the pre-flight processing checks whether a font unable to be processed is designated or not.

The normalize processing unit 205 converts the input PDL data to PDF if the input PDL data is not PDF but PostScript. The mark processing unit 206 applies graphic information of a designated mark, and superimposes the graphic information at a designated position on an output target print image such as a target print image.

The font processing unit 207 extracts font data, and embeds the font to PDL data, and outlines the font. The color management module (CMM) processing unit 209 converts a color space of an input image to cyan, magenta, yellow, black (CMYK) based on a color conversion table set by International Color Consortium (ICC) profile. The ICC profile includes color ICC information, and device ICC information.

The trapping processing unit 210 performs trapping processing. When different color regions are set adjacently via boundaries of the different color regions, a gap may occur at the boundaries when a positional error occurs for the adjacently-set different color regions. The trapping processing expands each of the color regions to fill the gap.

The calibration processing unit 211 adjusts fluctuation of generated color balance, caused by aging and individual difference of an output device, to enhance precision of color conversion by the CMM processing unit 209. Further, the process by the calibration processing unit 211 can be performed outside the RIP engine 120.

The screening processing unit 212 generates halftone dots in view of a final output such as printed sheet. Further, the process by the screening processing unit 212 can be performed outside the RIP engine 120 similar to the calibration processing unit 211. The output unit 213 transmits a RIP processing result to the outside of the RIP engine 120. The RIP processing result is any one of raster image, preview image, PDF, and intermediate data that are determined when the initialization is performed.

The rendering processing unit 218 performs a rendering processing to generate the raster data based on the input data. Further, as to the configuration of FIG. 9, the processing of the mark processing unit 206, and the processing of the font processing unit 207 can be collectively executed by the rendering processing unit 218.

Figure 10:
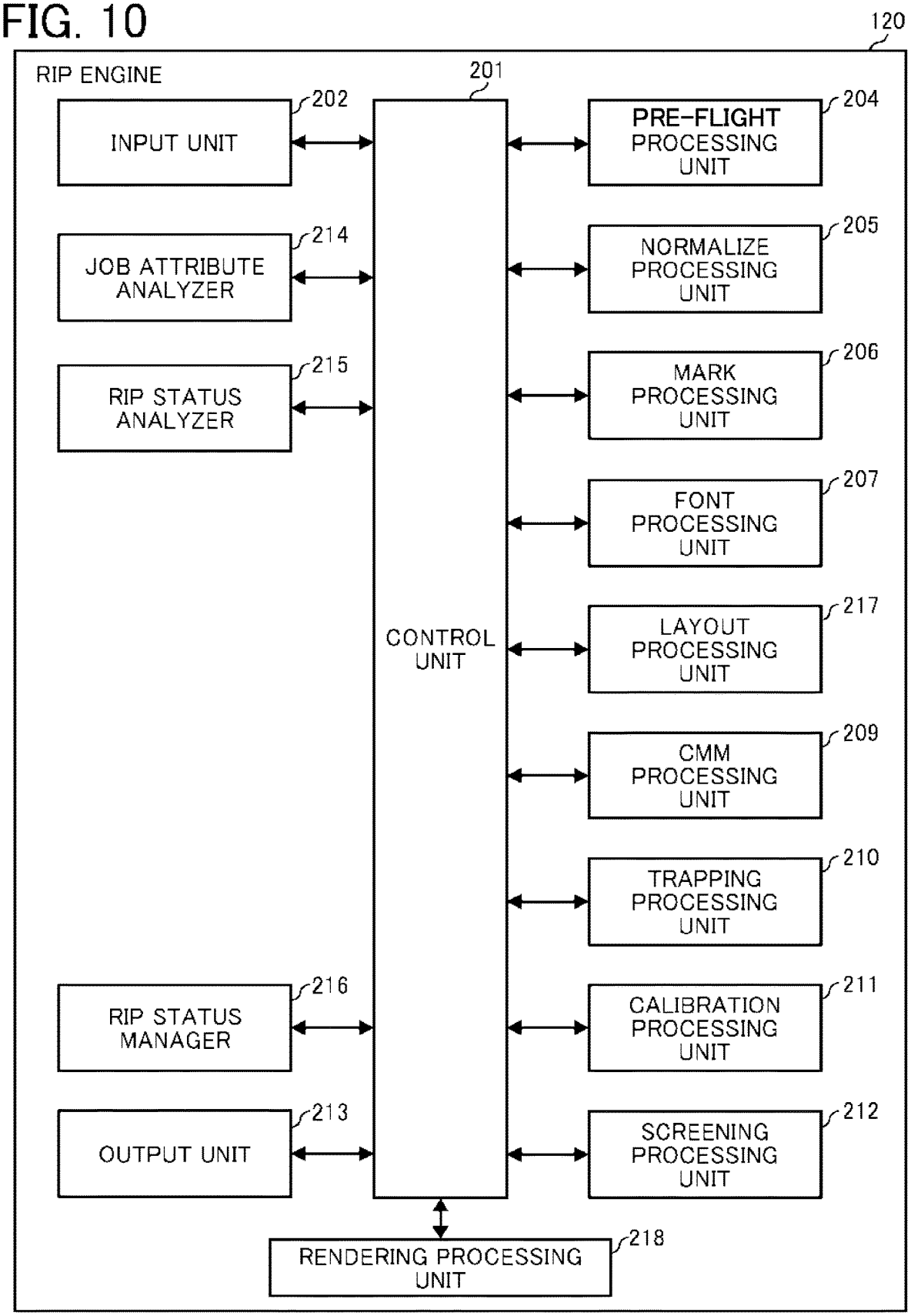
FIG. 10 is a schematic diagram illustrating another functional configuration of a RIP engine of an example embodiment of the present invention.

A description is given of another functional configuration of the RIP engine 120 with reference to FIG. 10. FIG. 10 is a schematic diagram illustrating another functional configuration of the RIP engine 120 without using the JDF analysis process by the JDF analyzer 117. As above described, a case that the JDF analyzer 117 does not perform the JDF analysis process means that the internal processes of RIP processing are performed by the HWF server 4 and the DFE 100 as the distributed processing. Therefore, the HWF server 4 includes the RIP engine 420 having the same configuration of the RIP engine 120 illustrated in FIG. 10.

As illustrated in FIG. 10, most of the functional configuration of the RIP engine 120 not using JDF analysis process by the JDF analyzer 117 are same as the functional configuration of the RIP engine 120 of FIG. 9. Hereinafter, portions different from the configuration of FIG. 9 are described. Similar to FIG. 9, the units other than the control unit 201 can be used as the extended units. Specifically, as illustrated in FIG. 10, the RIP engine 120 includes the control unit 201 and the extended units such as the input unit 202, the pre-flight processing unit 204, the normalize processing unit 205, the mark processing unit 206, the font processing unit 207, the color management module (CMM) processing unit 209, the trapping processing unit 210, the calibration processing unit 211, the screening processing unit 212, the output unit 213, a job attribute analyzer 214, a RIP status analyzer 215, a RIP status manager 216, a layout processing unit 217, and the rendering processing unit 218.

As to the configuration of FIG. 10, when the control unit 201 receives an initialization request from the input unit 202, the control unit 201 acquires the initialization request and the JDF information. Then, the control unit 201 analyzes the JDF information and PDL information by using the job attribute analyzer 214, and the control unit 201 determines a process sequence of the extended units, and a data format to be generated as a process result of each of the extended units same as the configuration of FIG. 9.

As to the RIP engine 120 disposed in the DFE 100, data format obtained as a process result by the RIP engine 120 often becomes the raster data to be input to the printer controller 122. By contrast, as to the RIP engine 420 disposed in the HWF server 4, data format obtained as a process result by the RIP engine 420 becomes different depending on patterns of the distributed processing by the HWF server 4 and the DFE 100. Therefore, the control unit 201 of the RIP engine 120 determines the data format (e.g., PDL information, intermediate data) of the process result based on an analysis result by the job attribute analyzer 214.

Further, the control unit 201 analyzes the RIP status information included in the JDF information by using the RIP status analyzer 215 to check whether one or more already-executed internal processes of RIP processing exist. If the already-executed internal process of the RIP processing unit exists, the corresponding extended unit is excluded from the target processing units of the RIP processing.

Further, the RIP status analyzer 215 can analyze the RIP status included in the JDF information, and the RIP status analyzer 215 can similarly analyze the RIP status based on PDL information. In a case of analyzing the PDL information, since the attribute information such as parameter is erased for the already-executed internal processes of RIP processing, it can determine which one or more of the internal processes of RIP processing are not yet performed based on the remaining attribute information.

The layout processing unit 217 performs the imposition process. Under the control of the control unit 201, the RIP status manager 216 changes the RIP status corresponding to each of the internal processes of RIP already performed by each of the extended units to "Done". The output unit 213 transmits a RIP result to the outside of the RIP engine. The RIP result is data having the data format that is determined when the initialization is performed.

The rendering processing unit 218 of FIG. 10 performs the rendering processing to generate the raster data based on the input data same as the configuration of FIG. 9. Further, as to the configuration of FIG. 10, the processing of the mark processing unit 206, the processing of the font processing unit 207, and further the processing of the layout processing unit 217 can be collectively executed by the rendering processing unit 218.

Further, as described above, the plurality of the RIP engines 120 disposed in the DFE 100 such as "DFE (engine A)" and "DFE (engine B)" can be selectively used depending on information of the "RIP device designation" included in the JDF information. Since the control unit 201 cannot consign the processing to the extended units of other RIP engine, the job controller 116 can be used to consign the processing.

As described above, the job controller 116 adds the "RIP engine identification information" to the RIP parameter. In this case, the job controller 116 generates different RIP parameters for each of the different internal processes of RIP processing designated with different RIP engines 120. In an example case of FIG. 3, the RIP parameter of "engine A" is generated or designated for executing the "font" and "layout," the RIP parameter of "engine B" is generated or designated for executing the "mark," and the RIP parameter of "engine A" is generated or designated for the subsequent processes after the "mark" as illustrated in FIG. 3.

Then, the job controller 116 requests the RIP unit 118 to perform the RIP processing based on each of the generated RIP parameters with a process sequence set for each of the internal processes of RIP processing. With this configuration, each of the internal processes of RIP processing can be performed by selectively using the different RIP engines such as "engine A" and "engine B."

In this process, each of the engines can perform only the designated process by referring the "RIP status" information. Specifically, by setting the status of to-be-processed image processing items as "NotYet" and the status of other image processing items as "Done," only the designated process can be performed.

Further, as to the above described HWF system according to an example embodiment, the RIP engine 420 disposed in the HWF server 4 and the RIP engine 120 disposed in the DFE 100 employ the same RIP engine. In this disclosure, the same RIP engine means that the RIP engine has the same configuration at least for generating the raster data.

Therefore, the RIP engine 420 and the RIP engine 120 may not employ the same configuration for every one of the processing units illustrated in FIGS. 9 and 10. Specifically, the RIP engine 420 and the RIP engine 120 employ the same configuration at least the one or more processing units illustrated in FIGS. 9 and 10 used for generating the raster data such as the mark processing unit 206, the font processing unit 207, the layout processing unit 217, and the rendering processing unit 218. Therefore, the RIP engine 420 and the RIP engine 120 employ the same configuration for at least the processing units used for generating the raster data. Further, the RIP engine 420 and the RIP engine 120 can employ the same configuration for other processing units as required.

Figure 11:
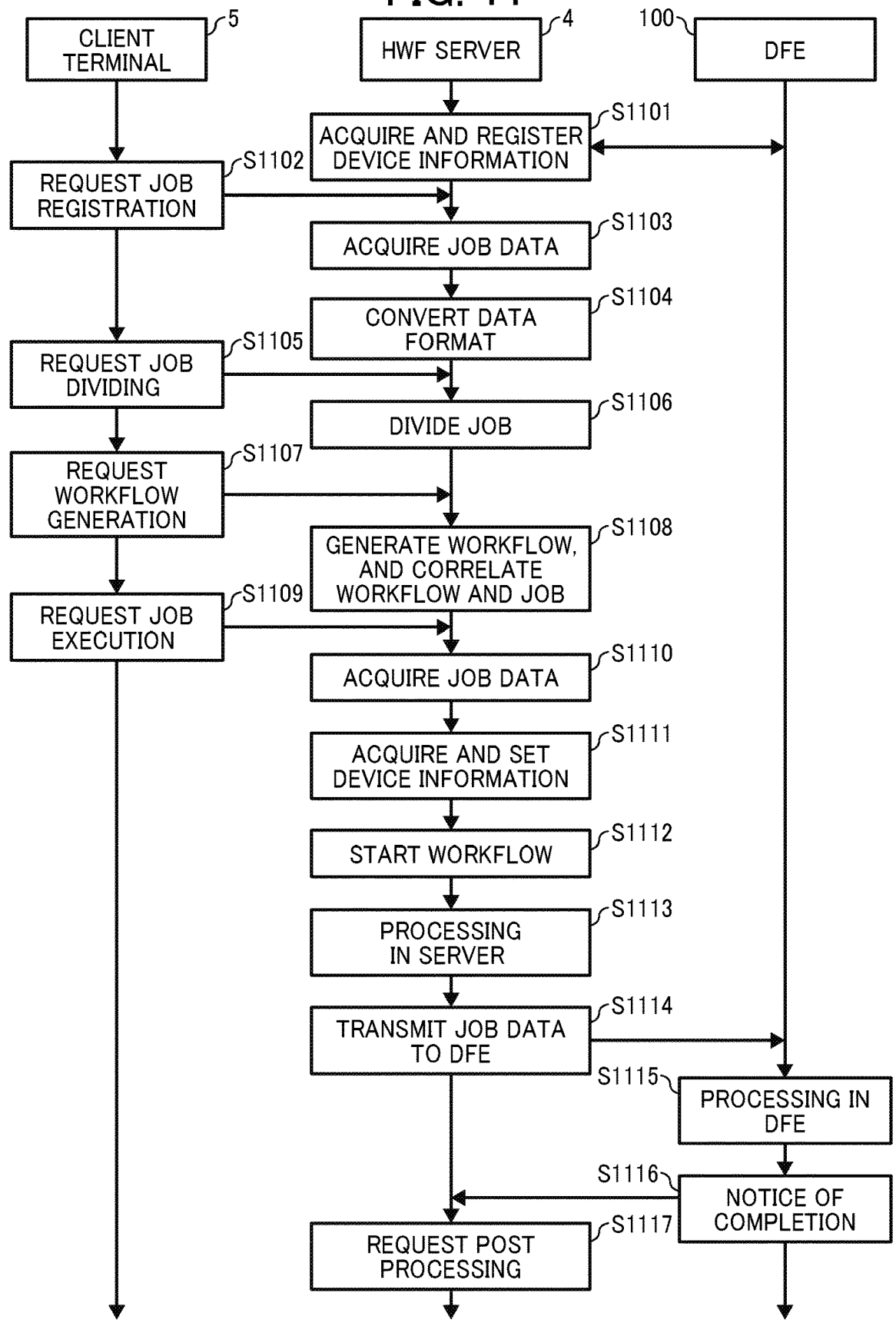
FIG. 11 is a sequential chart for an operation flow of a HWF system of an example embodiment of the present invention.

A description is given of an operation of the HWF system of the example embodiment with reference to FIG. 11. FIG. 11 is a sequential chart of an operation flow of the HWF system. FIG. 11 is an example of a sequential chart when the digital printer 1 executes a print output operation. As illustrated in FIG. 11, the device information communication unit 415 of the HWF server 4 acquires device information from the DFE 100 and the CTP 200 via a network, and the device information manager 416 registers the device information in the device information storage 417 (S1101). The process of S1101 can be performed at regular intervals.

When a registration of job data is performed by an operation of an operator to a GUI of the HWF system, the client terminal 5 transmits a job registration request to the HWF server 4 (S1102), in which the UI controller 412 of the HWF server 4 acquires the job registration request. With this configuration, the data receiver 411 acquires job data under the control of the system controller 410 (S1103).

When the data receiver 411 acquires the job data, the system controller 410 controls the job controller 413 to convert a format of the acquired job data to PDL format (S1104), and the format-converted job data is registered in the job data storage 414. As to the GUI that the registration of job data is performed at S1102, an interface such as a file path for designating a registration target data, and an input section for designating each of image processing items in the JDF information (FIG. 3) can be displayed.

Further, by performing the process at step S1101, the HWF server 4 can acquire information of the type of the RIP engine disposed in the DFE 100. Therefore, the information of the "RIP device designation" (FIG. 3) can be selectively input to the input section on the GUI of the client terminal 5, in which when the DFE 100 is to perform the processing, a specific RIP engine to perform the concerned processing can be selected.

Figures 12, 13:
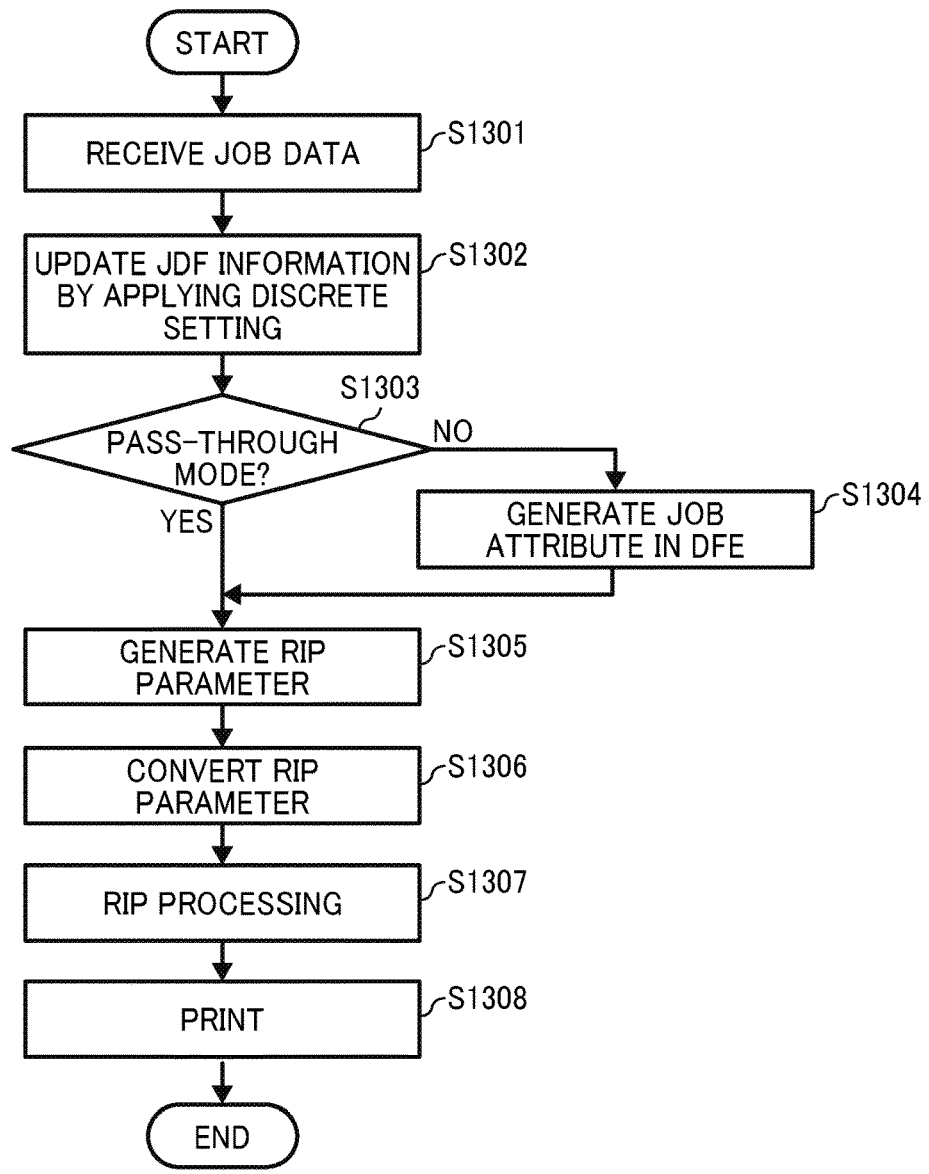
FIG. 12 illustrates an example of a dividing pattern of image data.
FIG. 13 is a flow chart showing the steps of processing in the DFE of an example embodiment of the present invention.

Further, when a process of dividing the job data is performed in response to an operation of the operator to the GUI of the HWF system, the client terminal 5 transmits a job dividing request to the HWF server 4 (S1105). When the job dividing request is issued at S1105, the operator designates the job dividing pattern as illustrated in FIG. 12. FIG. 12 is an example of information includable in the job dividing request transmitted at S1105. As illustrated in FIG. 12, information indicating a dividing target job and information indicating dividing contents are transmitted as the job dividing request. In this example case, the information indicating dividing contents is specifically correlated with a device to execute a print output operation of each of the dividing contents. In an example case of FIG. 12, one device is correlated for executing a print output operation of some pages, and another device is correlated for executing a print output operation of other pages, in which the devices are correlated with the unit of "page." The information indicated in FIG. 12 can be used as output destination designation information that designates different output destinations for different pages when the output target image includes a plurality of pages such as page data.

When the HWF server 4 receives the job dividing request, the system controller 410 divides the dividing target job (i.e., job data) page-by-page based on the information indicating the dividing contents (FIG. 12) to generate a plurality of sub-job data configuring the dividing target job (S1106). In this process, the device designated for each of the divided portions can be used as information of "device designation" in the JDF information (FIG. 3). When the job data is divided to generate the plurality of the sub-job data, each of the sub job data is stored in the job data storage 414 as a discrete job.

Further, when a process of generating a workflow is performed in response to an operation of the operator to the GUI of the HWF system, the client terminal 5 transmits a workflow generation request to the HWF server 4 (S1107). When the workflow generation request is transmitted, information designating the workflow contents and information identifying one or more jobs to be processed in line with the workflow information (FIG. 5) are transmitted.

When the HWF server 4 receives the workflow generation request, the system controller 410 inputs the information received with the workflow generation request to the workflow controller 418. With this configuration, the workflow controller 418 generates a new workflow information based on the received information, and stores the new workflow information in the workflow information storage 419, and correlates the new workflow information and the job identified by the workflow generation request (S1108). The workflow and the job can be correlated by adding, for example, an identifier identifying the workflow to the JDF information.

When a job execution operation is performed on the client terminal 5 such as when the job execution operation is performed in response to an operation of an operator to the GUI on the client terminal 5 after S1108, the client terminal 5 transmits a job execution request to the HWF server 4 (S1109). Further, steps S1102 to S1109 can be performed as different processes, or steps S1102 to S1109 can be performed as one-time process that performs the job registration request, job dividing request, workflow generation request, and job execution request as one operation.

When the HWF server 4 receives the job execution request, the system controller 410 acquires the designated job data from the job data storage 414 based on information for identifying the job data received with the job execution request (S1110). Further, the system controller 410 acquires the latest information of the device designated in the acquired job data from the device information manager 416, and sets the acquired latest device information to the job (S1111).

Then, the system controller 410 transfers the job data to the workflow controller 418 to start an execution of the workflow (S1112). The workflow controller 418 acquires the workflow information correlated to the acquired job data from the workflow information storage 419, and executes the processes in line with the workflow information.

As to the workflow processing, the processing in the HWF server 4 to be performed by the RIP engine 420 disposed in the HWF server 4 is executed at first (S1113). At S1113, under the control of the workflow controller 418, the job controller 413 controls the RIP engine 420 to execute the processes as described above.

When the workflow processing proceeds to a stage to transfer the workflow processing to the DFE 100, under the control of the workflow controller 418, the job controller 413 controls the job communication unit 421 to transmit the job data to the DFE 100 (S1114). At S1114, the job controller 413 designates one of the specific job receiving units 112 from the plurality of specific job receiving units 112 based on information designated in the JDF information.

When the job data is transmitted to the DFE 100, any one of the plurality of specific job receiving units 112 is designated, in which the specific job receiving unit 112 matched to the job data receives the job data in the DFE 100. When the job data is input into the DFE 100, as described above, the RIP processing and the output processing by the digital engine 150 are performed in the DFE 100 (S1115).

When the DFE 100 completes the designated processes, the job receiver 111 reports the completion notice of the processes to the HWF server 4 (S1116). When the job controller 413 receives the completion notice of the processes from the DFE 100 via the job communication unit 421, the job controller 413 reports the completion notice of the processes to the workflow controller 418. Then, the workflow controller 418 transmits a post processing request to the post-processing apparatus 3 to execute a post-processing designated in the workflow executable after the processing at the DFE 100 (S1117).

At S1117, under the control of the workflow controller 418, the job controller 413 controls the job communication unit 421 to transmit the post processing request to the post-processing apparatus 3. By performing the above described processing, the operation of the HWF system completes.

A description is given of a detail of the internal processing in the DFE 100 at S1115 (see FIG. 11) with reference to FIG. 13, which is a flow chart showing the steps of the processing in the DFE 100. As illustrated in FIG. 13, when the HWF server 4 transmit the job data to the DFE 100, the designated specific job receiving unit 112 receives the job data (S1301). After receiving the job data, the specific job receiving unit 112 updates the JDF information to apply the discrete setting, set to the specific job receiving unit 112, to the job data (S1302).

The above described "pass-through mode" can be also applied at S1302. The job data applied with the discrete setting is input to the system controller 113, and then the system controller 113 stores the input job data in the job data storage 114 depending on the settings, and performs a preview processing via the UI controller 115 depending on an operation of an operator.

The job execution timing of the DFE 100 can be set as below. For example, the job is executed when the job execution of the DFE 100 is requested by an operation of the operator, or when a timer counts the execution time set in advance, the system controller 113 inputs the job data to the job controller 116. Then, the job controller 116 checks whether the pass-through mode is set by referring the input job data (S1303). If the result is not the pass-through mode (S1303: NO), the job controller 116 outputs the job data to the JDF analyzer 117 to generate the job attribute in DFE (S1304).

If the result is the pass-through mode (S1303: YES) or the job attribute in DFE is generated by performing the JDF conversion (S1304), the job controller 116 generates the RIP parameter (S1305). If the result is not the pass-through mode (S1303: NO), the RIP parameter illustrated in FIG. 8 is generated at S1305. By contrast, if the result is the pass-through mode (S1303: YES), the RIP parameter is generated for information other than "input/output image information" among the information illustrated in FIG. 8, and the JDF information is referred for the "input/output image information."

When the job controller 116 generates the RIP parameter (S1305), the job controller 116 inputs required information to the RIP unit 118 to execute the RIP processing. In this sequence, when the RIP controller 119 performs the above described parameter conversion (S1306), the RIP controller 119 designates the converted parameters to the RIP engine 120, and instructs the RIP engine 120 to execute the RIP processing (S1307). With this configuration, the raster data can be generated by the RIP engine 120.

At S1305, as described above, based on information of the "RIP device designation" illustrated in FIG. 3, the RIP parameter can be generated for each one of the RIP engines. At S1307, the RIP processing is executed for each of the generated RIP parameters with a given process sequence to generate the raster data.

When the raster data is generated, and the job controller 116 acquires the raster data from the RIP unit 118, the job controller 116 inputs the raster data to the printer controller 122 to execute a print output operation by using the digital engine 150 (S1308). With this processing configuration, the internal processing in the DFE 100 is completed.

Figure 14:
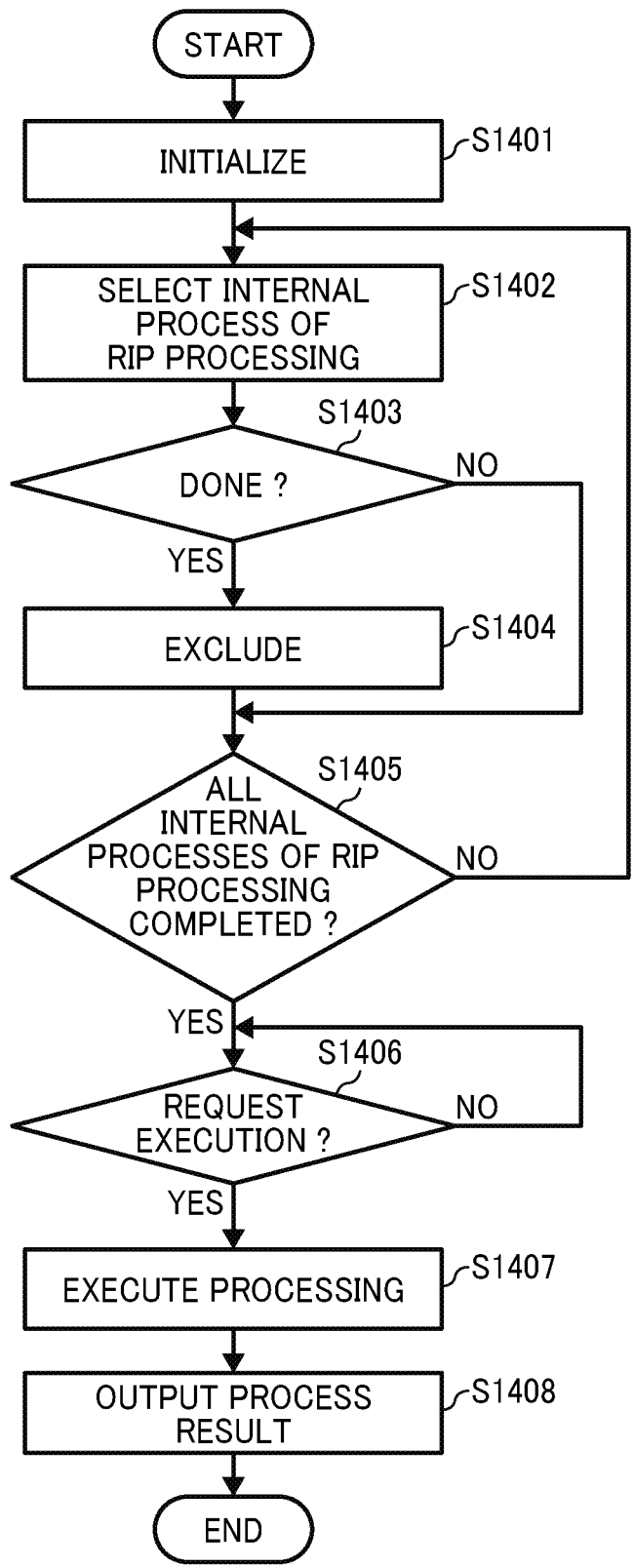
FIG. 14 is flow chart showing the steps of RIP processing of an example embodiment of the present invention.

A description is given of a detail of the RIP processing at S1307 of FIG. 13 with reference to FIG. 14. As illustrated in FIG. 14, based on the initialization request input to the input unit 202, the control unit 201 performs an initialization process (S1401). In an example case of FIG. 9, at S1401, the RIP parameter analyzer 203 receives and analyzes the RIP parameter, and determines one or more extended units to be used for executing one or more processes among the extended units included in the RIP engine 120, and a process sequence of processing of the extended units as described above. Further, the RIP parameter analyzer 203 determines a data format of data to be generated as a process result when the processing is performed.

Further, in another example case of FIG. 10, the job attribute analyzer 214 receives and analyzes JDF information and PDL information to determine one or more extended units to be used for executing one or more processes among the extended units included in the RIP engine 120, and a process sequence of processing of the extended units. Further, the job attribute analyzer 214 determines a data format of data to be generated as a process result when the processing is performed. Then, in another example case of FIG. 10, the control unit 201 instructs the RIP status analyzer 215 to execute the status analysis.

As to the RIP status analysis, the RIP status analyzer 215 refers or checks the "RIP status" (FIG. 3), and selects one image processing item of the internal processes of RIP processing (S1402). If the status of the selected image processing item is "Done" (S1403: YES), the corresponding extended unit is excluded from the extended units determined as the execution targets at S1401 (S1404). If the status of the selected image processing item is "NotYet" (S1403: NO), the sequence proceeds to S1405.

The RIP status analyzer 215 repeats steps from S1402 to S1405 until all of the image processing items of the internal processes of RIP processing is processed (S1405: NO). When the RIP status analyzer 215 completes steps from S1402 to S1405 for all of the image processing items of the internal processes of RIP processing (S1405: YES), and the input unit 202 acquires an execution request for the RIP processing (S1406: YES), the control unit 201 controls each of the extended units to execute the RIP processing with a given process sequence (S1407).

At S1407, the RIP processing is requested to one or more extended units determined at step S1401 and not excluded by the process at step S1404. Further, the RIP processing is requested to perform in line with the process sequence determined at step S1401. When the one or more extended units perform the RIP processing and the raster data is generated, the output unit 213 outputs a process result (S1408). With this processing configuration, the RIP processing by the RIP unit 118 completes.

In another example case of FIG. 10, steps S1402 to S1405 (i.e., status analysis) is performed only for the RIP engine 120 set with the pass-through mode because the status analysis is required when the RIP processing is divided and assigned for each of the HWF server 4 and the DFE 100 as described above.

Since the RIP engine disposed in the HWF server 4 and the RIP engine disposed in the DFE 100 use the RIP engine having the substantially same processing capabilities, the RIP processing can be performed as one processing without recognizing a boundary of the HWF server 4 and the DFE 100. Therefore, it is preferable to input data processed by the RIP engine 420 of the HWF server 4 to the RIP engine 120 of the DFE 100 as they are, in which the pass-through mode is suitable for the RIP processing because the JDF analyzer 117 disposed outside of the RIP engine 120 is not used.

However, this is just one example. Even if the pass-through mode is not used, the status analysis is required when the RIP processing is divided and assigned to each of the HWF server 4 and the DFE 100. Specifically, when the RIP processing is divided and assigned to each of the HWF server 4 and the DFE 100, the RIP processing already executed at the HWF server 4 is required to be excluded from the RIP processing when the RIP processing is executed at the DFE 100.

Therefore, even if the RIP engine 120 is not set with the pass-through mode, the RIP status analyzer 215 can be disposed to divide and assign the RIP processing to each of the HWF server 4 and the DFE 100. Specifically, when the RIP processing is divided and assigned to each of the HWF server 4 and the DFE 100, the JDF analysis can be performed by the JDF analyzer 117 at the DFE 100, and then the status analysis can be performed by the RIP status analyzer 215 to determine which internal process of RIP processing is required to be processed.

As to the above described HWF system according to an example embodiment, the RIP engine 420 disposed in the HWF server 4 and the RIP engine 120 disposed in the DFE 100 can employ the substantially same configuration as above described. Therefore, differences may not occur between the raster data of the print job processed by the RIP engine 420 used for a print output operation of the offset printer 2, and the raster data of the print job processed by the RIP engine 120 used for a print output operation of the digital printer 1. Therefore, differences of printout results caused by using different image forming apparatuses can be reduced, in particular, can be prevented.

However, if settings of the resource data (hereinafter, RIP resource data) such as font data, which is image processing data or information, to be used for the RIP processing at the HWF server 4 and the digital printer 1 are different, the image data integrity in the raster data may be lost. As to the example embodiment of the present disclosure, the RIP processing is performed by using the RIP resource data stored in the HWF server 4. The RIP resource data includes, for example, color conversion profile, font data, mark data, halftone screen data, and spot color matching data.

The color conversion profile is digitized color space information set for each device. The color conversion profile includes information of coordinates of three primary colors, coordinates of white color, and tone response profile, which are used to secure the color tone of the output image. The font data is information to use the same font in the output image. The mark data is information to use the same mark (e.g., crop color mark, color bar, text mark) in the output image.

The halftone screen data is information of ink arrangement density to set gradation in the output image. The spot color matching library is information to convert color ink other than C, M, Y, K color ink (hereinafter, specific color) to the same process color. For example, when image data using a specific color is input from the client terminal 5, the RIP processing is performed by referring the spot color matching library stored in the HWF server 4 to convert the specific color to CMYK.

Figure 15:
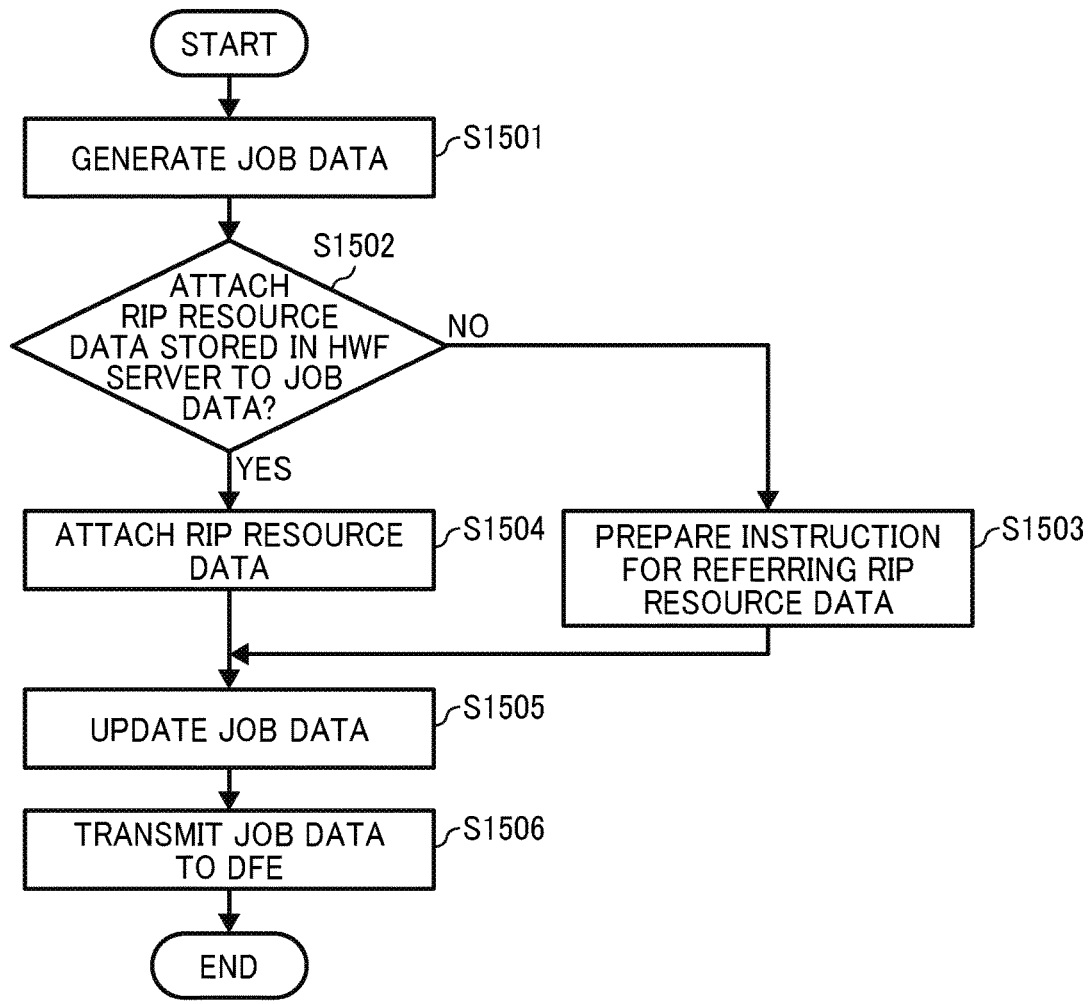
FIG. 15 is a flow chart illustrating the steps of a process of transmitting RIP resource data stored in the HWF server to the DFE.

A description is given of the RIP processing performed in the DFE 100 by using the RIP resource data stored in the HWF server 4 with reference to FIG. 15. FIG. 15 is a flow chart illustrating the steps of a process of transmitting the RIP resource data stored in the HWF server 4 to the DFE 100.

At first, the job controller 413 generates job data based on target print data acquired by the system controller 410 so that the DFE 100 can perform the RIP processing to the job data by referring the RIP resource data stored in the HWF server 4 (S1501). For example, based on an operation by an operator at the client terminal 5, the job controller 413 updates the job data so that the DFE 100 can perform the RIP processing by using the RIP resource data stored in the HWF server 4.

Specifically, the above described image processing data or information (e.g., color conversion profile, font data, mark data, halftone screen data, spot color matching data) stored in the HWF server 4 can be used by the DFE 100.

Figure 16:
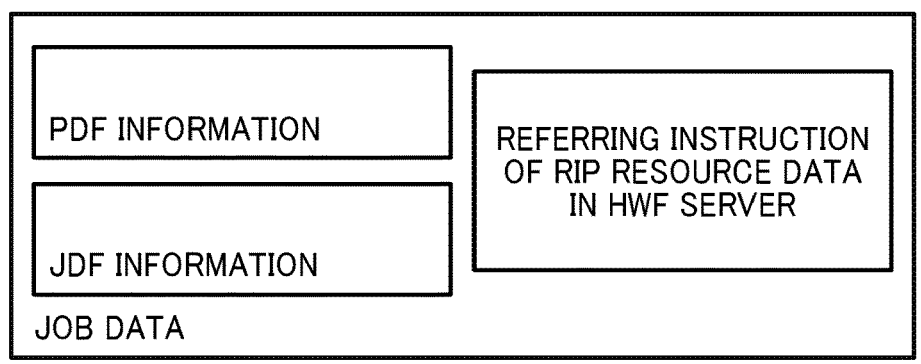
FIG. 16 is an example of job data adding referring instruction of RIP resource data.

Then, it is determined whether the RIP resource data stored in the HWF server 4 is attached to the job data (S1502). If a data size of the RIP resource data, required for executing the RIP processing, stored in the HWF server 4 is greater than a given data size, the job controller 413 updates the job data without attaching the RIP resource data (S1502: NO), and prepares an instruction for referring the RIP resource data stored in the HWF server 4 (hereinafter, referring instruction of RIP resource data) (S1503). When the RIP resource data is not attached to the job data, the job controller 413 updates the job data (S1505) by adding the referring instruction of RIP resource data stored in the HWF server 4 (S1503) as indicated in FIG. 16, which will be used when the DFE 100 performs the RIP processing.

Figure 17:
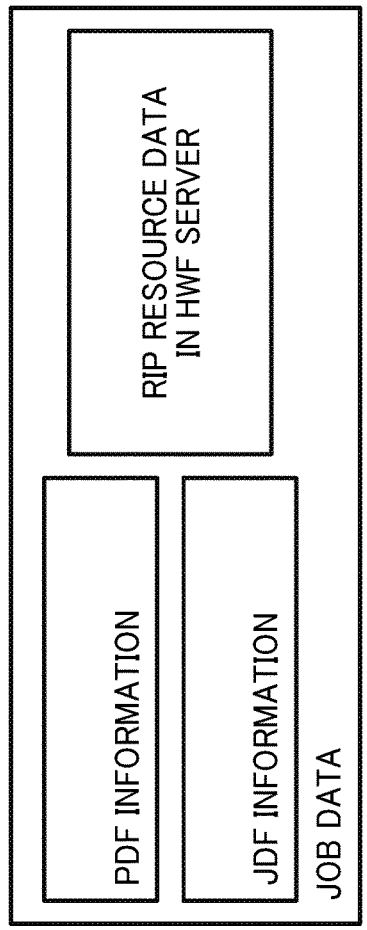
FIG. 17 is an example of job data adding RIP resource data.

If the data size of the RIP resource data, required for executing the RIP processing, stored in the HWF server 4, is less than the given data size (S1502: Yes), the job controller 413 attaches the RIP resource data, stored in the HWF server 4, to the job data (S1504) as indicated in FIG. 17, and updates the job data (S1505). The job communication unit 421 transmits the job data updated by the job controller 413 to the DFE 100 (S1506), and then the DFE 100 executes the RIP processing based on the updated job data.

As to the above described image processing system, the DFE 100 can execute the RIP processing by using the RIP resource data stored in the HWF server 4. Therefore, even if the RIP resource data stored in the HWF server 4 is not stored in the DFE 100, the RIP processing executable in the HWF server 4 can be executed at the DFE 100, and the raster data can be generated. In the above described example embodiment, the RIP resource data stored in the HWF server 4 can be used as control-side image processing data or information, which may be referred to as first image processing data, while the RIP resource data stored in the DFE 100 can be used as output-side image processing data or information, which may be referred to as second image processing data.

Further, the job controller 413 can determine whether the RIP resource data stored in the HWF server 4 is attached to the job data based on a communication busy status of communication line of the image processing system. Further, if a data size of the job data is greater than the given data size, the job controller 413 can update the job data by adding a description of referring the RIP resource data stored in the HWF server 4.

As to the above described image processing system of the first example embodiment, it is assumed that the RIP engine disposed in the HWF server 4 and the RIP engine disposed the DFE 100 have the same processing capabilities. However, when the software is updated, the version of the RIP engine 420 and the version of the RIP engine 120 may become different, with which the output result of the RIP processing by the RIP engine 420 and the output result of the RIP processing by the RIP engine 120 may become different. Therefore, in the second example embodiment, the version of the RIP engine 420 and the version of the RIP engine 120 are compared, and then a device or apparatus to execute the RIP processing is determined based on the comparison result.

Figure 18:
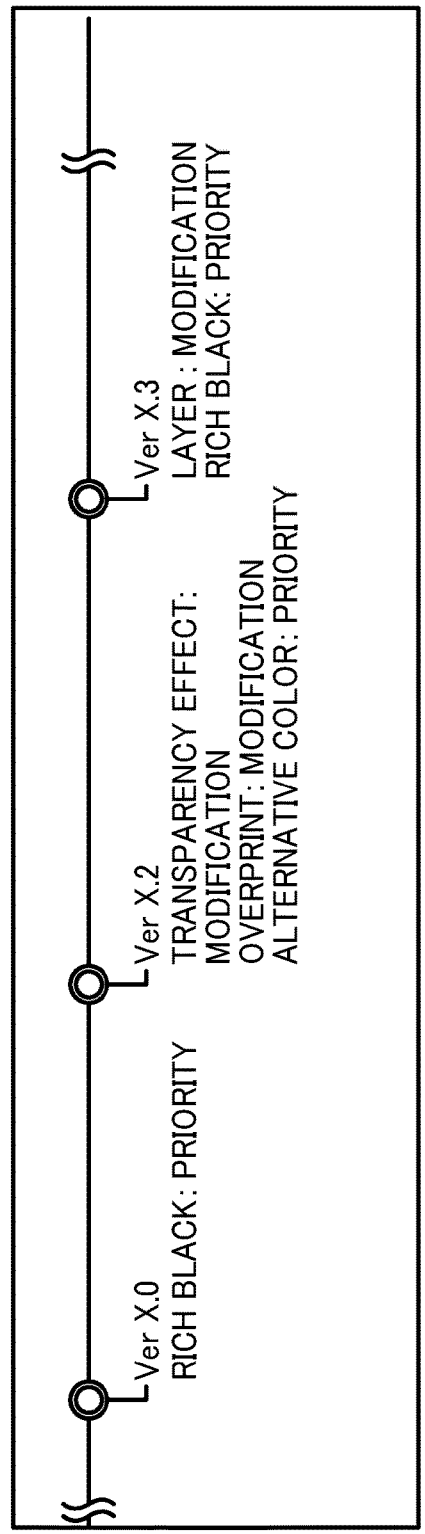
FIG. 18 is an example of modification of software when a RIP engine is developed in the software development process.

FIG. 18 is an example of modification of software when the RIP engine is developed in the software development process. The RIP engine generates the raster data to be used for a printing operation based on image data input to the HWF server 4. Therefore, as indicated in FIG. 18, when the software is updated to improve the image expression when the printing operation is performed, the version of the RIP engine may be changed.

As indicated in the updating process of software (FIG. 18), the color expression setting a priority on rich black is set for VerX.0. Then, transparency effect and overprint are changed and the color expression setting a priority on alternative color is set for VerX.1. When the RIP engine of one version and the RIP engine of another version perform the RIP processing based on the same image data, the output result of the RIP processing by the RIP engine 420 and the output result of the RIP processing by the RIP engine 120 may become different. For example, the arrangement and color of the drawn objects may become different.

Therefore, when the modification of software (see FIG. 18) is applied to the HWF server 4 and the DFE 100 independently, even if the RIP engine disposed in the HWF server 4 and the RIP engine disposed the DFE 100 have the same processing capabilities, the output result of the RIP processing by the RIP engine 420 and the output result of the RIP processing by the RIP engine 120 may become different because the version of the RIP engine 420 and the version of the RIP engine 120 are different.

Therefore, based on version information of the RIP engine 420 having one version and version information of the RIP engine 120 having another version, the system controller 410 determines whether the output result of the RIP processing by the RIP engine 420 and the output result of the RIP processing by the RIP engine 120 become different. Therefore, the version information of the RIP engine 420 is used as the control-side image processing data or information, which may be referred to as first image processing data, and the version information of the RIP engine 120 is used as the output-side image processing data or information, which may be referred to as second image processing data.

When the system controller 410 determines whether the output result of the RIP processing by the RIP engine 420 and the output result of the RIP processing by the RIP engine 120 become different, the system controller 410 performs the determination based on image processing data or information to be referred when the raster data is generated. Specifically, the system controller 410 determines whether the output result of the RIP processing by the RIP engine 420 and the output result of the RIP processing by the RIP engine 120 become different based on the description of the parameters of the internal processing of the RIP processing set for the RIP engine 420 having one version and the RIP engine 120 having another version.

Further, if the system that manages the development of the RIP engine is used, the system controller 410 can determine whether the output result of the RIP processing by the RIP engine 420 and the output result of the RIP processing by the RIP engine 120 become different by referring capability information that is changed when the version is changed.

Figures 19, 20:
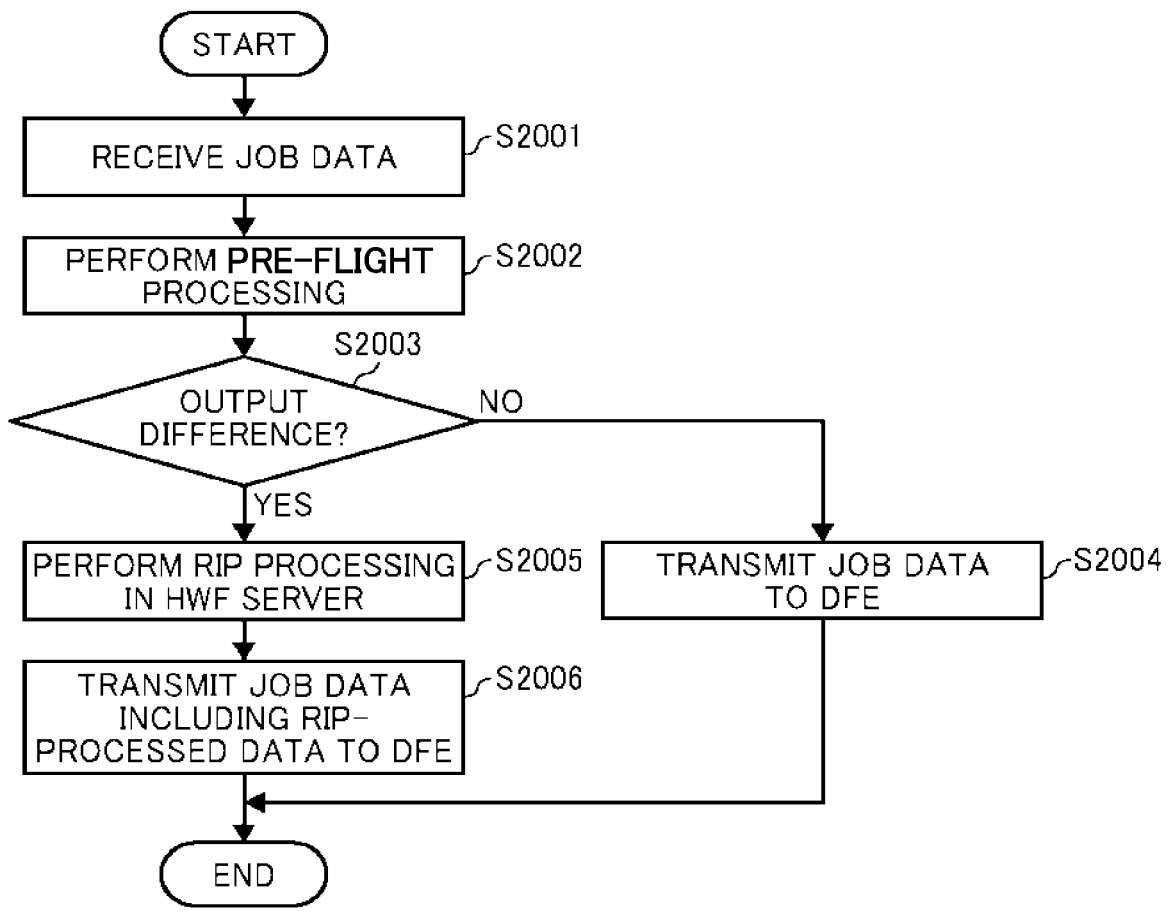
FIG. 19 is an example of a table associating capabilities installed for RIP engines, and the differences of output result of RIP processing
FIG. 20 is a flow chart illustrating the steps of a process of determining a device or apparatus to perform the RIP processing by using the HWF server.

Further, when the output result of the RIP processing by the RIP engine 420 and the output result of the RIP processing by the RIP engine 120 become different due to the version information of the RIP engine 420 and the version information of the RIP engine 120, the output difference can be stored in the device information storage 417 as a list as indicated in FIG. 19. FIG. 19 is an example of a table associating capabilities installed for the RIP engine 420 having one version and the RIP engine 120 having another version, and the differences of the output result of the RIP processing by the RIP engine 420 having one version and the RIP engine 120 having another version.

Further, the system controller 410 can determine whether the output result of the RIP processing by the RIP engine 420 and the output result of the RIP processing by the RIP engine 120 become different by referring the output difference list (see FIG. 19) by using the device information manager 416 via the network. Then, based on the determination result, a device or apparatus to perform the RIP processing is determined in the second example embodiment.

A description is given of a process of determining a device or apparatus to perform the RIP processing with reference to FIG. 20. FIG. 20 is a flow chart illustrating the steps of a process of determining a device or apparatus to perform the RIP processing by using the HWF server 4 based on a difference of the output result of the RIP processing by the RIP engine 420 having one version and the output result of the RIP processing by the RIP engine 120 having another version.

Based on image data input from the client terminal 5, the system controller 410 instructs the job controller 413 to generate job data. Then, the job controller 413 transmits the generated job data to the RIP engine 420. When the RIP engine 420 receives the job data (S2001), the RIP engine 420 analyzes JDF information included in the job data to perform a pre-flight processing (S2002). At S2002, it is determined which process included in the RIP processing is performed at the RIP engine 420 when the RIP engine 420 performs the RIP processing based on the received job data.

After the job controller 413 generates the job data, the system controller 410 acquires the version information of the RIP engine 420 and the version information of the RIP engine 120 via the device information manager 416. Then, based on the acquired version information and the pre-flight processing result performed by the RIP engine 420, the system controller 410 determines whether the output difference occurs between the RIP processing by the RIP engine 420 and the RIP processing by the RIP engine 120 when the RIP processing is performed by the RIP engine 420 and the RIP engine 120 (S2003). Therefore, the system controller 410 can be used as a control-side difference determination unit.

When the pre-flight processing of the job data is performed (S2002), the system controller 410 can determine that the sequential order and priority of processes to be performed for the RIP processing by using the RIP engine 420 having one version and the RIP engine 120 having another version become difference, and then the system controller 410 determines that the output difference occurs. Further, the system controller 410 can determine that the output difference occurs when the capabilities listed in the output difference list (see FIG. 19) are performed by the RIP processing. Then, the job controller 413 updates the job data based on the determination result of the system controller 410 at S2003.

If the system controller 410 determines that the output difference does not occur to the output result of the RIP processing by the RIP engine 420 and the output result of the RIP processing by the RIP engine 120 (S2003: NO), the job controller 413 transmits the job data, which is to be RIP processed at the RIP engine 120, to the DFE 100 (S2004). When the DFE 100 receives the job data, the RIP engine 120 performs the RIP processing required for generating the raster data.

If the system controller 410 determines that the output difference occurs to the output result of the RIP processing by the RIP engine 420 and the output result of the RIP processing by the RIP engine 120 (S2003: YES), the job controller 413 updates the job data so that the RIP processing required for generating the raster data is performed at the HWF server 4 (S2005). At this stage, the job data can be updated by controlling the RIP status based on the pre-flight processing result at S2002. For example, the RIP status is controlled so that the RIP engine 420 disposed in the HWF server 4 performs the RIP processing for one or more capabilities that the output difference will occur alone.

Then, the job controller 413 instructs the RIP engine 420 to perform the RIP processing based on the updated job data. When the RIP engine 420 performs the RIP processing, the RIP engine 420 generates data processed by the RIP processing, and this data is referred to as the RIP-processed data. The system controller 410 transmits the job data including the RIP-processed data to the DFE 100 (S2006).

Then, the DFE 100 performs the printing operation based on the job data including the RIP-processed data received from the system controller 410. At this stage, if the RIP engine 420 performs the RIP processing to one or more capabilities that the output difference will occur alone, the DFE 100 can sequentially perform the RIP processing for other capabilities to the job data received from the system controller 410.

As above described, based on the output difference of the RIP engine 420 and the RIP engine 120, the HWF server 4 determines the device or apparatus to perform the RIP processing.

Further, the device or apparatus to perform the RIP processing can be determined by the DFE 100. Specifically, when the DFE 100 receives the job data, the RIP engine 120 can perform the pre-flight processing to the received job data. Based on the pre-flight processing result by the RIP engine 120, the device or apparatus to perform the RIP processing can be determined. A description is given of a process of determining the device or apparatus to perform the RIP processing by using the DFE 100 with reference to FIG. 21.

Figure 21:
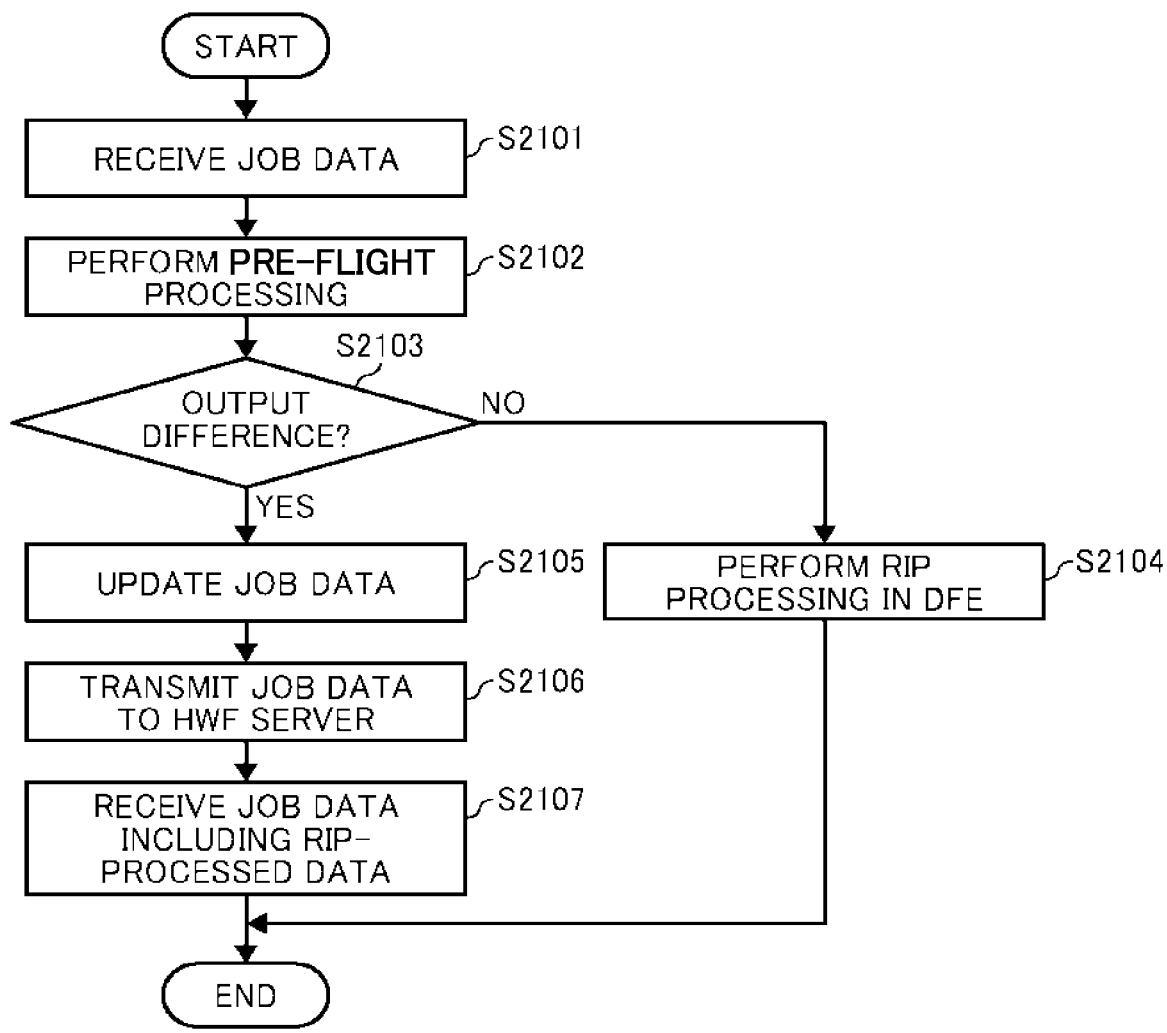
FIG. 21 is a flow chart illustrating the steps of a process of s of determining the device or apparatus to perform the RIP processing by using the DFE.

FIG. 21 is a flow chart illustrating the steps of a process of determining the device or apparatus to perform the RIP processing by using the DFE 100 when the output difference occurs due to the RIP engine 420 having one version and the RIP engine 120 having another version.

When the RIP engine 120 receives the job data (S2101), the RIP engine 120 analyzes JDF information included in the job data to perform a pre-flight processing (S2102). At S2102, it is determined which process included in the RIP processing is to be performed at the RIP engine 120 when the RIP engine 120 performs the RIP processing based on the received job data.

After the job controller 116 generates the job data, the system controller 113 acquires the device information based on the version information of the RIP engine 420 and the version information of the RIP engine 120 via the device information manager 123. Then, based on the acquired version information and the pre-flight processing result performed by the RIP engine 120, the system controller 113 determines whether the output difference occurs between the RIP processing by the RIP engine 420 and the RIP processing by the RIP engine 120 when the RIP processing is performed by the RIP engine 420 and the RIP engine 120 (S2103). Therefore, the system controller 113 can be used as a determination unit that controls the difference determination process. The job controller 116 updates the job data based on the determination result of the system controller 113 at S2103. Further, the system controller 113 determines whether the output difference occurs due to the difference of the RIP engine 420 and the RIP engine 120 similar to the system controller 410.

If the system controller 113 determines that the output difference does not occur to the output result of the RIP processing by the RIP engine 420 and the output result of the RIP processing by the RIP engine 120 (S2103: NO), the job controller 116 instructs the RIP engine 120 to perform the RIP processing (S2104) in the DFE 100.

If the system controller 113 determines that the output difference occur to the output result of the RIP processing by the RIP engine 420 and the output result of the RIP processing by the RIP engine 120 (S2103: YES), the job controller 116 updates the job data so that the RIP processing required for generating the raster data is performed at the HWF server 4 (S2105). At this stage, the job data can be updated by controlling the RIP status based on the pre-flight processing result at S2102. For example, the RIP status is controlled so that the RIP engine 420 disposed in the HWF server 4 performs the RIP processing for one or more capabilities that the output difference will occur alone, in which the updated job data is transmitted from the system controller 113 to the HWF server 4 via the job receiver 111 (S2106). Therefore, the job controller 116 can be used as a process execution controller that controls the execution process.

Then, the job controller 413 instructs the RIP engine 420 to perform the RIP processing based on the job data received from the DFE 100, in which it can be configured that the RIP engine 420 performs the RIP processing to the one or more capabilities that the output difference will occur alone. When the RIP engine 420 performs the RIP processing, the RIP engine 420 generates data processed by the RIP processing, and this data is referred to as the RIP-processed data. The system controller 410 transmits the job data including the RIP-processed data to the DFE 100 via the data receiver 411. Then, the DFE 100 receives the job data including the RIP-processed data (S2107), and performs the printing operation. As above described, the DFE 100 can determine the device or apparatus to perform the RIP processing based on the output difference of the RIP engine 420 and the RIP engine 120.

As to the above described image processing system, when the difference is to occur to the printed products due to the difference of the RIP processing by the RIP engine disposed in the HWF server 4 and the RIP processing by the RIP engine disposed in the DFE 100, the HWF server 4 performs the RIP processing. With employing this configuration, the differences of the printed products between the digital printer 1 and the offset printer 2 can be reduced, in particular prevented. As to the above described image processing system, the HWF server 4 performs the RIP processing to reduce the differences of the printed products between the digital printer 1 and the offset printer 2 because the HWF server 4 generates the raster data to be used for the plate of the offset printer 2.

As to the above described embodiment of the image processing system, differences of a printed product of one image forming apparatus and a printed product of another image forming apparatus can be reduced, in particular prevented.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above described image processing method performable in the image processing apparatus can be described as a computer-executable program, and the computer-executable program can be stored in a ROM or the like in the image processing apparatus and executed by the image processing apparatus. Further, the computer-executable program can be stored in a storage medium or a carrier such as compact disc-read only memory (CD-ROM), digital versatile disc-read only memory (DVD-ROM) or the like for distribution, or can be stored on a storage on a network and downloaded as required.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of present disclosure and appended claims.

What is claimed is:

1. An image generation-output control apparatus for use in an image processing system for controlling an image generation and output operation based on an instruction received from a server in the image processing system, the server communicable with a first image forming apparatus of a first type and a second image forming apparatus of a second type which is different from the first type in the image processing system, the server to generate first image drawing information which includes first raster data, the image generation-output control apparatus comprising:

raster generation circuitry having substantially same raster generation as the raster generation of the server, the raster generation circuitry being configured to generate second image drawing information which includes second raster data based on output target image information and image processing data, and to instruct the second image forming apparatus to perform an image forming operation based on the generated second image drawing information; and a memory to store said image processing data applicable to an image processing to be performed for outputting the target image using the second image forming apparatus, wherein the raster generation circuitry is further configured to determine whether to operate in a pass-through mode in which the server performs part of image processing steps and the raster generation circuitry performs a remainder of the image processing steps or not to operate in the pass-through mode, operate in the pass-through mode when the raster generation circuitry determines to operate in the pass-through mode, and determine whether a difference occurs between the first image drawing information, generated by the server, and the second image drawing information generated by the raster generation circuitry when the first image drawing information and the second image drawing information are generated from the same output target image information, the raster generation circuitry determines that the difference occurs between the first image drawing information and the second image drawing information when settings for the raster generation circuitry and settings of the raster generation of the server are different, and when the raster generation circuitry determines that the difference occurs, the raster generation circuitry determines that one or more image processing items of the first image drawing information and the second image drawing information have the difference between the first image drawing information and the second image drawing information, and the server instructs the raster generation circuitry to perform the image forming operation using the second image forming apparatus based on the first image drawing information at least for the one or more image processing items having the difference between the first image drawing information and the second image drawing information.

2. The image generation-output control apparatus according to claim 1, wherein in a case that the raster generation circuitry operates in the pass-through mode, the server performs the part of the image processing steps and the raster generation circuitry performs the remainder of the image processing steps.

3. The image generation-output control apparatus according to claim 1, wherein the raster generation circuitry is further configured to, in a case that the raster generation circuitry determines to not operate in the pass-through mode, perform all of the image processing steps.

4. The image generation-output control apparatus according to claim 1, wherein the raster generation circuitry generates the second image drawing information based on image processing data of the server and the output target image information when the raster generation circuitry acquires the image processing data of the server from the server.

5. A method of controlling an image generation and output operation by using an image generation-output control apparatus in an image processing system based on an instruction received from a server in the image processing system, the server communicable with a first image forming apparatus of a first type and a second image forming apparatus of a second type which is different from the first type in the image processing system, the server to generate first image drawing information which includes first raster data, the method comprising:

generating second image drawings information which includes second raster data by using raster generation circuitry having substantially same raster generation as the raster generation of the server, based on output target image information and image processing data;

instructing the second image forming apparatus to perform an image forming operation based on the generated second image drawing information;

storing, in a memory, said image processing data applicable to an image processing to be performed for outputting the target image using the second image forming apparatus;

first determining, using the raster generation circuitry, whether to operate in a pass-through mode in which the server performs part of image processing steps and the raster generation circuitry performs a remainder of the image processing steps or not to operate in the pass-through mode;

operating in the pass-through mode when the raster generation circuitry determines to operate in the pass-through mode; and second determining whether a difference occurs between the first image drawing information, generated by the server, and the second image drawing information generated by the raster generation circuitry when the first image drawing information and the second image drawing information are generated from the same output target image information, wherein the second determining indicates that the difference occurs between the first image drawing information and the second image drawing information when settings for the raster generation circuitry and settings of the raster generation of the server are different, and when the second determining indicates that the difference occurs, the method further comprises third determining that one or more image processing items of the first image drawing information and the second image drawing information have the difference between the first image drawing information and the second image drawing information, and the server instructs the raster generation circuitry to perform the image forming operation using the second image forming apparatus based on the first image drawing information at least for the one or more image processing items having the difference between the first image drawing information and the second image drawing information.

6. An image generation-output control apparatus for use in an image processing system for controlling an image generation and output operation based on an instruction received from a server in the image processing system, the server communicable with a first image forming apparatus of a first type and a second image forming apparatus of a second type which is different from the first type in the image processing system, the server to generate first image drawing information which includes first raster data, the image generation-output control apparatus comprising:

raster generation circuitry having substantially same raster generation as the raster generation of the server, the raster generation circuitry being configured to generate second image drawing information which includes second raster data based on output target image information and image processing data;

instruct the second image forming apparatus to perform an image forming operation based on the generated second image drawing information; and determine whether a difference occurs between the first image drawing information, generated by the server, and the second image drawing information generated by the raster generation circuitry when the first image drawing information and the second image drawing information are generated from the same output target image information, wherein when the raster generation circuitry determines that the difference occurs, the raster generation circuitry is further configured to determine that one or more image processing items of the first image drawing information and the second image drawing information have the difference between the first image drawing information and the second image drawing information, and the server instructs the raster generation circuitry to perform the image forming operation using the second image forming apparatus based on the first image drawing information at least for the one or more image processing items having the difference between the first image drawing information and the second image drawing information.

7. The image generation-output control apparatus according to claim 6, further comprising:

a memory to store said image processing data applicable to an image processing to be performed for outputting the target image using the second image forming apparatus, wherein the raster generation circuitry determines that the difference occurs between the first image drawing information and the second image drawing information when settings for the raster generation circuitry and settings of the raster generation of the server are different.

\* \* \* \* \*